United States Patent
Gilberti et al.

(10) Patent No.: US 8,224,745 B2
(45) Date of Patent: Jul. 17, 2012

(54) AUTOMATIC DELINQUENCY ITEM PROCESSING WITH CUSTOMIZATION FOR LENDERS

(75) Inventors: John M. Gilberti, Highland Village, TX (US); Rick Holcomb, Corinth, TX (US); Nancy Walker, Grand Prairie, TX (US); Shane Jones, Lewisville, TX (US); Bobbie Johannes, Lewisville, TX (US); Ben Agenbag, Trophy Club, TX (US); Paul Comer, Flower Mound, TX (US)

(73) Assignee: CoreLogic Tax Services, LLC, Westlake, TX (US)

( * ) Notice: Subject to any disclaimer, the term of this patent is extended or adjusted under 35 U.S.C. 154(b) by 0 days.

(21) Appl. No.: 12/651,137

(22) Filed: Dec. 31, 2009

(65) Prior Publication Data

US 2010/0106629 A1    Apr. 29, 2010

Related U.S. Application Data

(62) Division of application No. 11/712,836, filed on Mar. 1, 2007, now abandoned.

(60) Provisional application No. 60/813,222, filed on Jun. 13, 2006.

(51) Int. Cl.
*G06Q 40/00* (2006.01)

(52) U.S. Cl. ............... 705/38; 705/31; 705/39; 707/946

(58) Field of Classification Search .................... 705/31, 705/38, 39; 707/946
See application file for complete search history.

(56) References Cited

U.S. PATENT DOCUMENTS

| | | | |
|---|---|---|---|
| 4,774,664 A | 9/1988 | Campbell et al. | |
| 5,206,949 A | 4/1993 | Cochran et al. | |
| 5,659,731 A | 8/1997 | Gustafson | |
| 5,875,437 A | 2/1999 | Atkins | |
| 5,892,900 A | 4/1999 | Ginter et al. | |
| 5,903,886 A | 5/1999 | Heimlich et al. | |
| 5,930,775 A * | 7/1999 | McCauley et al. | 705/36 R |
| 6,064,990 A | 5/2000 | Goldsmith | |
| 6,393,387 B1 | 5/2002 | Adriaans et al. | |
| 6,484,176 B1 | 11/2002 | Sealand et al. | |
| 6,636,803 B1 | 10/2003 | Hartz et al. | |

(Continued)

FOREIGN PATENT DOCUMENTS

EP    1067492    10/2001

(Continued)

OTHER PUBLICATIONS

"Stovroff Offers New Services to Home Buyers, Sellers" Lisa Haarlander, Jul. 17, 2001, Buffalo News, 2010 Factiva, Inc. pages 1-2 ( © 2001 Buffalo News. Provided by ProQuest Information and Learning).

(Continued)

*Primary Examiner* — Thomas Dixon
*Assistant Examiner* — Gerald Vizvary
(74) *Attorney, Agent, or Firm* — Oblon, Spivak, McClelland, Maier & Neustadt, L.L.P.

(57) ABSTRACT

A method of processing delinquency items associated with taxes on properties may include receiving preferences from two or more lenders. Delinquency items may be automatically processed according to the preferences of each lender for their respective loans. The preferences may include business rules for whether to process a delinquency item. A lender preference may include specific criteria for a determination process (e.g., criteria for when to act on delinquencies with respect to particular states).

7 Claims, 15 Drawing Sheets

U.S. PATENT DOCUMENTS

| | | | |
|---|---|---|---|
| 6,721,728 B2 | 4/2004 | McGreevy | |
| 6,766,322 B1 | 7/2004 | Bell | |
| 6,871,140 B1 | 3/2005 | Florance et al. | |
| 6,871,189 B2* | 3/2005 | Brier et al. | 705/35 |
| 7,028,052 B2 | 4/2006 | Chapman et al. | |
| 7,054,841 B1 | 5/2006 | Tenorio | |
| 7,181,465 B2 | 2/2007 | Maze et al. | |
| 7,310,618 B2 | 12/2007 | Libman | |
| 7,580,890 B2 | 8/2009 | Siegel et al. | |
| 7,587,348 B2 | 9/2009 | Liao et al. | |
| 7,599,882 B2 | 10/2009 | Cagan | |
| 7,653,592 B1* | 1/2010 | Flaxman et al. | 705/38 |
| 7,668,769 B2 | 2/2010 | Baker et al. | |
| 7,747,520 B2 | 6/2010 | Livermore et al. | |
| 7,747,521 B2 | 6/2010 | Serio | |
| 7,835,986 B2 | 11/2010 | Serio | |
| 2002/0026394 A1* | 2/2002 | Savage et al. | 705/34 |
| 2002/0049624 A1 | 4/2002 | Raveis, Jr. | |
| 2002/0059139 A1 | 5/2002 | Evans | |
| 2002/0087460 A1 | 7/2002 | Hornung | |
| 2002/0107703 A1 | 8/2002 | Feinberg et al. | |
| 2002/0128960 A1 | 9/2002 | Lambiotte et al. | |
| 2003/0050891 A1 | 3/2003 | Cohen | |
| 2003/0083916 A1 | 5/2003 | Tracey et al. | |
| 2003/0105707 A1 | 6/2003 | Audebert et al. | |
| 2003/0187826 A1 | 10/2003 | Kennedy et al. | |
| 2004/0024605 A1 | 2/2004 | Morris | |
| 2004/0059653 A1 | 3/2004 | Verkuylen et al. | |
| 2004/0128232 A1 | 7/2004 | Descloux | |
| 2004/0138995 A1 | 7/2004 | Hershkowitz et al. | |
| 2004/0230448 A1 | 11/2004 | Schaich | |
| 2005/0065874 A1 | 3/2005 | Lefner et al. | |
| 2005/0071376 A1 | 3/2005 | Modi | |
| 2005/0108136 A1* | 5/2005 | Schneider | 705/36 |
| 2005/0187863 A1 | 8/2005 | Whinery et al. | |
| 2005/0209873 A1 | 9/2005 | Anastasi | |
| 2005/0210068 A1 | 9/2005 | Szymanski et al. | |
| 2005/0246270 A1* | 11/2005 | Goodman | 705/39 |
| 2005/0278246 A1 | 12/2005 | Friedman et al. | |
| 2006/0080230 A1 | 4/2006 | Freiberg | |
| 2006/0178971 A1 | 8/2006 | Owen et al. | |
| 2006/0184374 A1 | 8/2006 | Long | |
| 2007/0033126 A1 | 2/2007 | Cagan et al. | |
| 2007/0203815 A1* | 8/2007 | Maegerlein | 705/31 |
| 2007/0282735 A1 | 12/2007 | Schuebert | |
| 2007/0294303 A1 | 12/2007 | Harmon et al. | |
| 2008/0281647 A1 | 11/2008 | Morris | |
| 2008/0281648 A1 | 11/2008 | Morris | |
| 2008/0281649 A1 | 11/2008 | Morris | |
| 2009/0099959 A1 | 4/2009 | Liao et al. | |
| 2010/0088242 A1 | 4/2010 | Cagan | |
| 2010/0145836 A1 | 6/2010 | Baker et al. | |

FOREIGN PATENT DOCUMENTS

| | | |
|---|---|---|
| WO | WO 00/25251 | 5/2000 |
| WO | WO 00/46769 | 8/2000 |
| WO | WO 2006/031626 | 3/2006 |

OTHER PUBLICATIONS

Stovroff.com, http://web.archive.org/web/20020204061657/www.stovroff.com/default.cfm, "Stovroff Realty is now RealtyUSA".

"Six Florida Realtor Organizations Sign Multi-Year Agreements with Interealty; 30,000 Realtors Statewide to Be Offered MLXchange, the Leading MLS Software System", Business Wire, Oct. 2, 2002, 2010 Factiva, Inc. pp. 1-2 (Copyright © 2002, Business Wire).

MLXchange Training Guide MLXchange, Version 1.4 (Copyright © 2003 Interealty Corp) Updated Sep. 5, 2003.

U.S. Appl. No. 12/904,713, filed Oct. 14, 2010, Serio.

"Trilegiant & MyPublicInfo Announce Partnership to Offer ID Theft Prevention Service", PR Newswire (U.S.), Oct. 12, 2005, (Copyright © 2005 PR Newswire Association LLC), 2010 Factiva, Inc., pp. 1-2.

"Guard you financial info doggedly", USA Today, Sandra Block, http://www.usatoday,com/money/perfi/general/2005-06-30-protect_x.htm, p. 1.

"Browsing for Housing", Anne Kandra, Apr. 1999, PC World, pp. 193-197, 202, 204.

www.$$$.com "Search long enough and you can find financial Web sites that will knock your socks off. We did the searching for you", Elizabeth Razzi and Ronaleen R. Roha, Kiplinger's Personal Finance Magazine, Oct. 1996.

Buyer's Guide, "Contact Management Software, Manage your Customer List", Michael Antoniak, Realtor Magazine, www.realtormag.com, pp. 48-51.

Buyer's Guide, Net-Based Solutions, Michael Antoniak, "Take It Online", Realtor Magazine, www.Realtor.org/realtormag, pp. 30-31.

"Real Estate Rainmaker Guide to Online Marketing", Dan Gooder Richard, (Copyright © 2004 by Daniel Gooder Richard), Chapter 8, "Capturing E-Leads from Your Website". pp. 113-117.

ProQuest, http://proquest.umi.com.libproxv.mit.edu/pgdweb?index=11&sid=1&src, The Wall Street Journal, "Big Brother-in-Law: If the FBI Hopes to Get the Goods on You, It May Ask ChoicePoint—U.S. Agencies' Growing Use of Outside Data Suppliers Raiser Privacy Concern—A Fugitive Rents a Mailbox" Glenn R. Simpson, Apr. 13, 2001, p. A.1.

"How To Be Invisible", A Step-By-Step Guide to Protecting Your Assets, Your Identity, and Your Life, J.J. Luna, Copyright © 2000 by Editorial de Las Islas LC., Thomas Dunne Books.

"An Unlikely Hit: Credit Scores", Burney Simpson, Collections and Recovery, Credit Card Management, Apr. 2002; 15, 1; ABI/INFORM Global, pp. 16, 18, 20.

KnowX—web.archive.org/web/20060113035726/http://www.knowx.com (2005) (KnowX).

Jay Romano, Your Home; Holding a House Hostage, Aug. 22, 1999, The New York Times, (Hostage).

U.S. Appl. No. 11/712,833, filed Mar. 1, 2007, Gilberti.
U.S. Appl. No. 11/712,834, filed Mar. 1, 2007, Gilberti.
U.S. Appl. No. 11/712,835, filed Mar. 1, 2007, Gilberti.
U.S. Appl. No. 11/712,836, filed Mar. 1, 2007, Gilberti.

* cited by examiner

| State Matrix | | 722 | 724 |
|---|---|---|---|
| State | Bucket | Qualifying Delinquent Year (equal to or less than) | Current year |
| AK | 2 | 2003 | 2005 |
| AL | 3 | 2002 | 2005 |
| AR | 5 | 2000 | 2005 |

Foreclosure Cost

| State | Total F/C |
|---|---|
| AK | $ X |
| AL | $ Y |
| AR | $ Z |

— 740

AUTOMATIC DELINQUENCY ITEM PROCESSING WITH CUSTOMIZATION FOR LENDERS

CROSS-REFERENCE TO RELATED APPLICATIONS

This application is a divisional of and claims the benefit of priority under 35 U.S.C. §120 from U.S. application Ser. No. 11/712,836, filed on Mar. 1, 2007, and Provisional Patent Application No. 60/813,222 entitled "TAX DELINQUENCY MONITORING AND RESPONSE SYSTEM" filed on Jun. 13, 2006, the entire contents of each of which are incorporated herein by reference in their entirety.

BACKGROUND OF THE INVENTION

1. Field of the Invention

The present invention generally relates to systems and methods for monitoring and responding to tax delinquencies. In particular, embodiments relate to systems and methods for tracking, reporting, and resolving tax delinquencies on real properties to protect the interests of mortgage lenders.

2. Brief Description of the Related Art

When a financial institution such as a bank makes a loan to enable a borrower to buy real property, the financial institution generally acquires a lien (e.g., a mortgage) on the property to secure the loan. If the borrower defaults on the loan, the lender can foreclose on the property to mitigate the lender's loss from the default.

Governmental entities such as counties, school districts, and municipalities may also have liens on a property if taxes due on the property have not been paid. In addition, other parties may acquire interests in real properties after tax defaults through mechanisms such as tax sales and foreclosures. Therefore, a mortgage lender typically monitors tax payment and delinquencies, as well as related actions by tax authorities, to ensure that the lender's interests in properties securing their loans are not compromised. In some cases, a mortgage lender may intervene by redeeming a property itself (e.g., by paying a delinquent tax after a borrower's default) in order to protect the lender's interests.

Real property mortgage lenders often engage service providers to advise the lenders of the status of property tax payments due on real estate securing their loans. In addition to monitoring tax payment status, service providers may provide a variety of other tax-related services to lenders. For example, where a mortgage lender requires that tax payments be impounded on behalf of borrowers, a service provider may monitor and oversee the transfer of monies to the taxing authorities and provide confirmation to the lender that the taxes have been paid.

A service provider's lender customers may have a large number of loans secured by real properties in a multitude of locations. A large service provider will thus need to monitor tax payment and delinquency status for a multitude of taxing authorities (e.g., county tax collectors, school districts) nationwide. Service providers generally perform their services using a combination of automated systems and manual activities.

As the number of loans being serviced by a service provider increases, the demands on computer and human resources may become substantial. Moreover, due to the multitude of variations in laws, rules, and procedures of the various taxing authorities, the job of monitoring and addressing delinquency conditions may be complex. In addition, a substantial amount of resources may be needed to retrieve the relevant payment and delinquency status information and to determine the amounts due to the taxing authority. For example, for each property for which a tax default has occurred, the amount required to "redeem" the property, including interest, costs, and other charges, must be determined based on the particular laws and rules of the relevant taxing authority. The burden may be greatest in cases where a substantial number of loans being monitored are to "non-prime" borrowers, since the frequency and severity of defaults by such borrowers may be relatively greater than for other loans. When delinquency conditions are not identified and addressed in a timely manner, the cost impact to a lender can be significant.

It would be desirable to have systems and methods to more effectively ensure that tax delinquency conditions on real properties are promptly identified and acted upon in a reliable and efficient manner. In addition, it would be desirable to have systems and methods that reduce demands on system requirements such as processing loads and bandwidth.

SUMMARY OF THE INVENTION

Various systems and methods for identifying, monitoring, reporting, and resolving tax delinquencies are described. In an embodiment, a method of searching for tax delinquency information relating to a loan includes receiving order data for the loan. The order data may include property identification data for a property associated with the loan. A database is backsearched to determine if there any outstanding tax bills associated with the property. The property identification data is screened against one or more tax data files to determine if there are any delinquency items (e.g., delinquent taxes, tax liens, tax sales) associated with the property. In some embodiments, the tax data files are data files maintained by a taxing authority. The tax data 10 files may reside on computer systems controlled by the taxing authorities. The tax data files may be accessed in a number of ways, including, but not limited to, over a network, by file transfer, on portable media received from the taxing authority, etc. If there are any delinquency items associated with the property, a determination may be made whether to perform one or more processes for at least one of the delinquency items. The determination may be based on one or more rules.

In some embodiments, backsearching includes searching a master file for providing tax services to lenders, tax line setup data, and beneficiary change data.

In an embodiment, a method of selectively processing delinquency items associated with taxes on 20 properties includes storing rules in a data set. The rules may include criteria for determining whether to perform one or more processes for each delinquency item. A redemption search determination may be made using the rules to determine whether a search for redemption data should be made for each delinquency item. If the redemption search determination is positive, a redemption search is conducted and a redemption amount is determined and reported to a lender. A payment determination may be made using the rules to determine whether a payment should be made to redeem a property associated with a delinquency item. If the payment determination is positive, a lender on the property may be notified that a redemption payment is appropriate or payment may be issued to the taxing authority in accordance with the lender's payment rules.

In an embodiment, criteria for whether to perform a process may vary depending on the state in which the property resides. A delinquency date of the delinquency item may be tested against threshold date for the state in which the property resides. In some embodiments, an equity analysis may be performed on the item if the state criteria for processing the delinquency item are met. The equity analysis may include calculating an equity amount of the property and comparing the equity amount to a loan amount for the property. If the equity amount meets predetermined criteria relative to the loan amount, a process (e.g., preparing a redemption report, initiating a payment request) may be performed for the delinquency item. In certain embodiments, the criteria are customizable for two or more lenders. Preferences for a lender may be configured in a variety of ways, including, but not limited to, over networks, file transfer, or portable media, or written instructions.

In an embodiment, a method of processing a delinquency item associated with a tax on a property includes identifying the delinquency item and determining a state associated with the delinquency item. A delinquency date associated with the delinquency item (e.g., the date when a tax payment was due) is determined. A threshold date is retrieved for the state from a data set. In one embodiment, the data set is a state matrix table. The delinquency date is compared to the threshold date for the state. If the delinquency date is the same as or earlier than the threshold date, the processing is performed for the delinquency item.

In an embodiment, a method of processing delinquency items associated with taxes on properties includes receiving preferences from two or more lenders. Delinquency items may be automatically processed according to the preferences of each lender for their respective loans, The preferences may include business rules for whether to process a delinquency item. A lender preference may include specific criteria for a determination process (e.g., criteria for when to act on delinquencies with respect to particular states). In certain embodiments, a lender preference may include whether to opt in or opt out of a process (e.g., whether or not to perform an equity analysis in a given situation). Preferences may be configurable by a lender electronically.

BRIEF DESCRIPTION OF THE DRAWINGS

Features and advantages of the methods and apparatus of the present invention will be more fully appreciated by reference to the following detailed description of illustrative embodiments in accordance with the present invention when taken in conjunction with the accompanying drawings in which.

Figure 1:
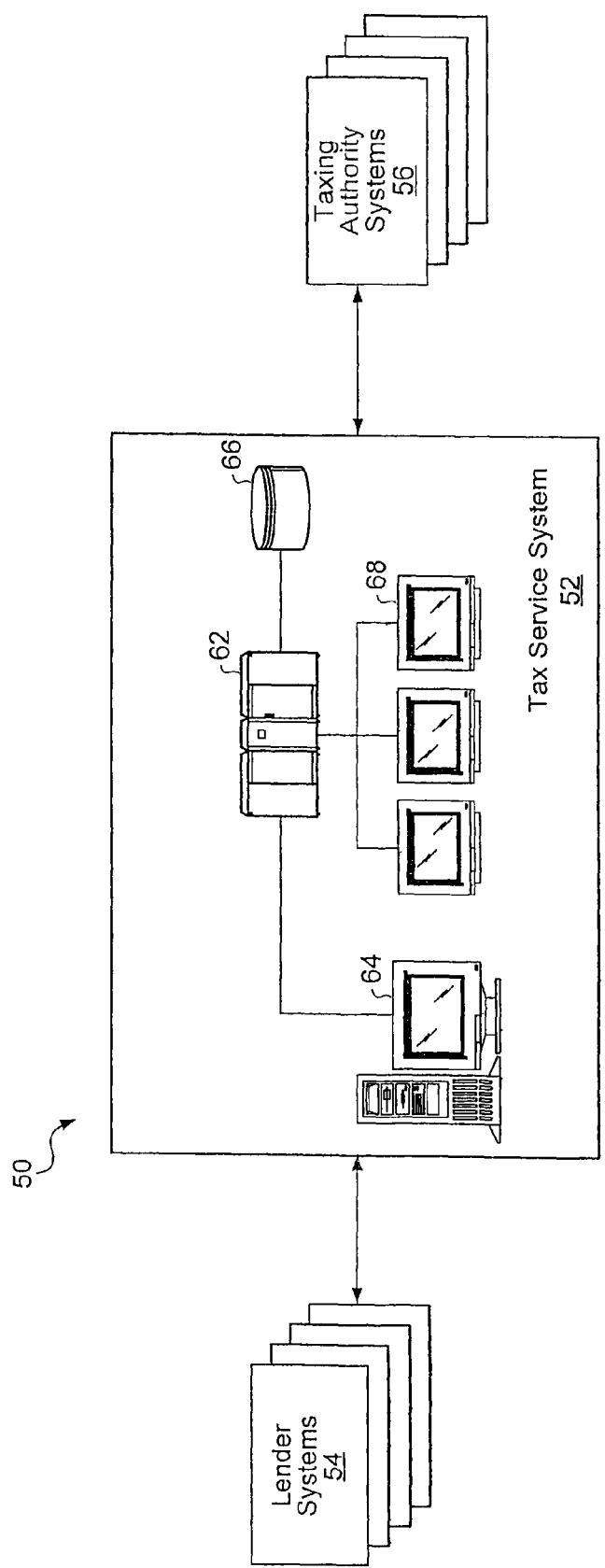
FIG. 1 is a schematic diagram illustrating a system for monitoring and reporting tax delinquencies according to one embodiment.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims.

DETAILED DESCRIPTION OF EMBODIMENTS

Systems and methods for identifying tax delinquencies on real properties and for tracking, reporting, and acting on such delinquencies are described. Applications include, but are not limited to, tracking and resolving delinquencies of non-prime borrowers. In some embodiments, the systems and methods are used by service entities to provide information and outsourcing services to lenders. In other embodiments, lenders use the systems and methods to track and manage their own loan accounts.

The term "computer system" as used herein generally refers to the hardware and software components that in combination allow the execution of computer programs. The computer programs may be stored in software, hardware, or a combination thereof. A computer system's hardware generally includes a processor, memory media, and input/output devices. As used herein, the term "processor" generally describes the logic circuitry that responds to and processes the basic instructions that operate a computer system (e.g., a central processing unit). The term "memory" includes an installation medium, such as a CD-ROM; a volatile computer system memory such as DRAM, SRAM, Rambus RAM; or a non-volatile memory such as optical storage or a magnetic medium, e.g., a hard drive.

The term "business rule" as used herein includes a statement that defines or constrains some aspect of a business. For example, a business rule may require action by a lender if a certain condition exists relative to a loan.

FIG. 1 illustrates a system for providing tax delinquency monitoring and reporting services to lenders. System 50 may include tax service system 52, lender systems 54, and taxing authority systems 56. Tax service system 52, lender systems 54, and taxing authority systems 56 may be computer systems. Tax service system 52 may be controlled and operated by a service provider. Lender systems 54 may be controlled and/or operated by a lender or an agent thereof. Each of taxing authority systems 56 may be controlled and operated by a taxing authority (e.g., a tax collector, county appraisal district) or an agent thereof. As used herein, "controlled" includes direct control and indirect control (e.g., through an agent such as a private contractor). As used herein, "received from" or "sent to" an entity (e.g., a taxing authority or a lender) includes receiving and sending to an agent of the entity. For example, information "received from a taxing authority" includes information received from an agent of the taxing authority, such as a private contractor that produces, maintains, or manages tax data for a taxing authority.

Tax service system 52 may send data to and receive data from lender systems 54. Data may be transferred between tax service system 52 and lender systems 54 in a variety of ways, including, but not limited to, a network, file transfer, or on portable media. Tax service system 52 may receive various data and instructions from lender systems 54. Examples of information received from a lender may include new loan orders and loan data. The data received from lender may be used to provide tax monitoring, loan administration services, and other services to lenders and other parties. Tax service system 52 may send various reports and other data to lender systems 54. Examples of information sent to lender systems includes tax payment status reports, payment confirmation, delinquency information, and tax sale information. Tax service system 52 may respond to specific queries from one of lender systems 54. Tax service system 52 may also automatically transmit information to lenders (e.g., in a monthly report).

Tax service system 52 may send data to and receive data from taxing authority systems 56. Data may be transferred between tax service system 52 and taxing authority systems 56 in a variety of ways, including, but not limited to, a network, file transfer, or on portable media. Tax service system 52 may acquire information from taxing authority systems 56. For example, tax service system 52 may initiate a search for property taxed by one of the taxing authorities to acquire tax delinquency status, tax sale, or lien related information. In some embodiments, data acquisition from taxing authority systems may be automated. Networks for communicating data between tax service system 52 and other systems may include one or more wide area networks (WAN) and local area networks (LAN). In some embodiments, a single network may connect tax service system 52 with lender systems 54 and taxing authority systems 56. In one embodiment, tax service system 52 is connected to other elements of system 50 via the Internet. In certain embodiments, a network may include distributed components, as in a client/server model.

Tax service system 52 includes mainframe 62 and workstations 64. Mainframe 64 is coupled to database 66 and terminals 68. Database 66 may have various loan and/or tax related data used in processing transactions and providing services to lenders. Mainframe 62 may perform various processing tasks required to provide loan and tax monitoring, reporting, searching, tracking, payment, analysis and other services to lenders. Workstation 64 and terminals 68 may enable users to operate, direct, update, and maintain mainframe 62. Mainframe 62 and workstations 64 may have various input/output devices, such as monitors, keyboards, printers, and scanners. In some embodiments, workstations 64 may be connected directly to one or more networks. A tax service system may have other architectures, such as client/server.

Taxing authority systems 56 may provide data relating to taxation of a property. Data may be contained in one or more tax data files. As used herein, a "data file" includes any collection of related data records. Data on taxing authority systems may include tax status, tax amounts, lien data, and tax sale data.

Figure 2:
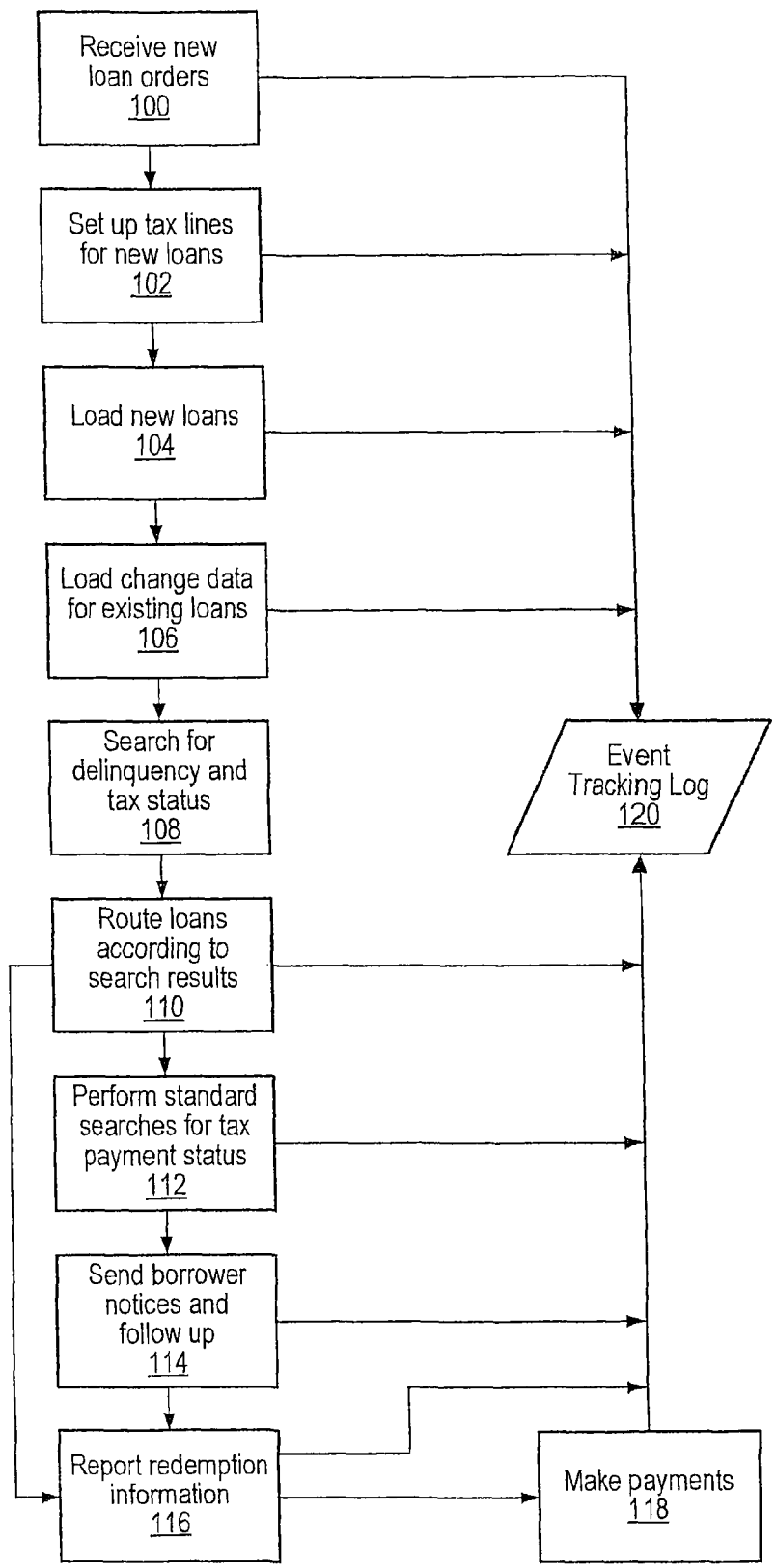
FIG. 2 is a flowchart illustrating tracking and resolution of tax delinquencies according to one embodiment.

FIG. 2 illustrates tracking and resolution of tax delinquencies according to one embodiment. In 100, new loan orders are received for processing in a tax service system. In one embodiment, new loans are received as orders from one or more lender customers.

In 102, a tax line may be set up for each new loan. The tax line setup may capture various tax related information relating to a loan. Each loan order received may include property identifying information (e.g., a description of a property associated with the loan, such as a legal description including a township, range, section, etc.) Each new loan may be searched by description for identification of a taxing authority and tax identification number. In some embodiments, a tax line set-up includes scanning of one or more documents of an order, In 104, newly set up loans are loaded into a tax service system. In some embodiments, loans are loaded in batch files on a periodic basis (e.g., daily). In 106, change data for loans already in the system may be loaded into the tax service system.

In 108, initial delinquency and tax status searches may be conducted to determine tax payment and delinquency status for a property associated with a loan. The searches may be conducted on data internal to the tax service system and external to the tax service system. For example, searches may be conducted of tax data files administered, controlled, generated, or maintained by a taxing authority. In some cases, the searches may reveal that a tax payment has been recently made for a property and that no tax delinquencies exist. In other cases, the searches may reveal that there are one or more delinquencies relating to the property associated with a loan. As used herein, a "delinquency item" includes any information on a condition or event relating to a past or current tax delinquency. "Delinquency item" also includes any information disclosing a governmental or private party interest (e.g., a lien) that may have arisen relating to past or current tax obligations. Examples of delinquency items include data on tax delinquencies (i.e., a tax payment is past due) or tax sales (whether they have already occurred or not). Delinquency items may also include exceptions such as duplicate liens, invalid tax identification number, and excess liens.

In 110, where no delinquency items are identified for a loan, the system maintains the loan data for reassessment of tax payment and delinquency status at standard, scheduled intervals (such as described below with respect to 112). Where a tax delinquency item is identified for a loan, the process flow proceeds directly to redemption reporting (such as described below with respect to 116).

In 112, searches are conducted at scheduled intervals to track and monitor tax payment status. In one 35 embodiment, standard searches are conducted annually. In cases where a borrower has failed to pay taxes when due, the lender may be notified of the delinquency. In 114, a delinquency notice and follow up process is implemented. A delinquency notice (e.g., a dunning letter) may be transmitted to the borrower. The notice may be in the form of a mailed letter, an email message, or other communication. After the notice is sent, a follow up process may be undertaken to monitor whether the borrower remedies the delinquency within a designated period.

For loans where delinquencies have not been paid or otherwise remedied, the system may proceed with redemption reporting. In 116, a redemption report is produced. As used herein, "redemption" or "redeem" refers to any act to redeem a property after a tax delinquency or to correct, cure, or reverse a tax delinquency condition. "Redemption" may refer to an act before or after a tax sale. As used herein, "redemption reporting" refers to determining redemption information and/or outputting the redemption information for reporting, review, or further action or processing. Determining redemption information may include acquiring information from external or internal systems (e.g., taxing authority systems, lender systems), applying business rules, performing computations, or a combination thereof. Redemption information may include redemption amounts. As used herein, a "redemption amount" refers to an amount of payment required to redeem a property. Redemption amounts may include past due tax amounts, interest, costs, penalties, and other charges.

A redemption report may be based on information retrieved from the relevant taxing authority and/or computations performed in a tax service system. Redemption information, including the amount necessary to redeem the property and related information to protect the lender's interest from actions by the taxing authority, may be reported. A redemption report may be sent to each lender for which delinquencies have not been remedied.

Once the redemption amount has been established, a system may process and make payment to the relevant taxing authority to cure the delinquency. In 118, payment is made to the taxing authority. In some embodiments, the relevant lender is notified that a payment to a taxing authority may be warranted to protect the lender's rights in a property. The lender may make a final decision on whether payment is to be made. If payment is to be made, the lender may make appropriate payment itself or direct another party (e.g., a service bureau) to make, the payment. In one embodiment, the lender authorizes the tax service provider that provided the payment determination information to make the payment. In other embodiments, payment is automatically made based on predetermined rules applied in a tax service system. Different lenders may establish different rules to be applied for payments associated with their loans.

All events during steps 110-118 may be logged in event tracking log 120.

Figure 3:
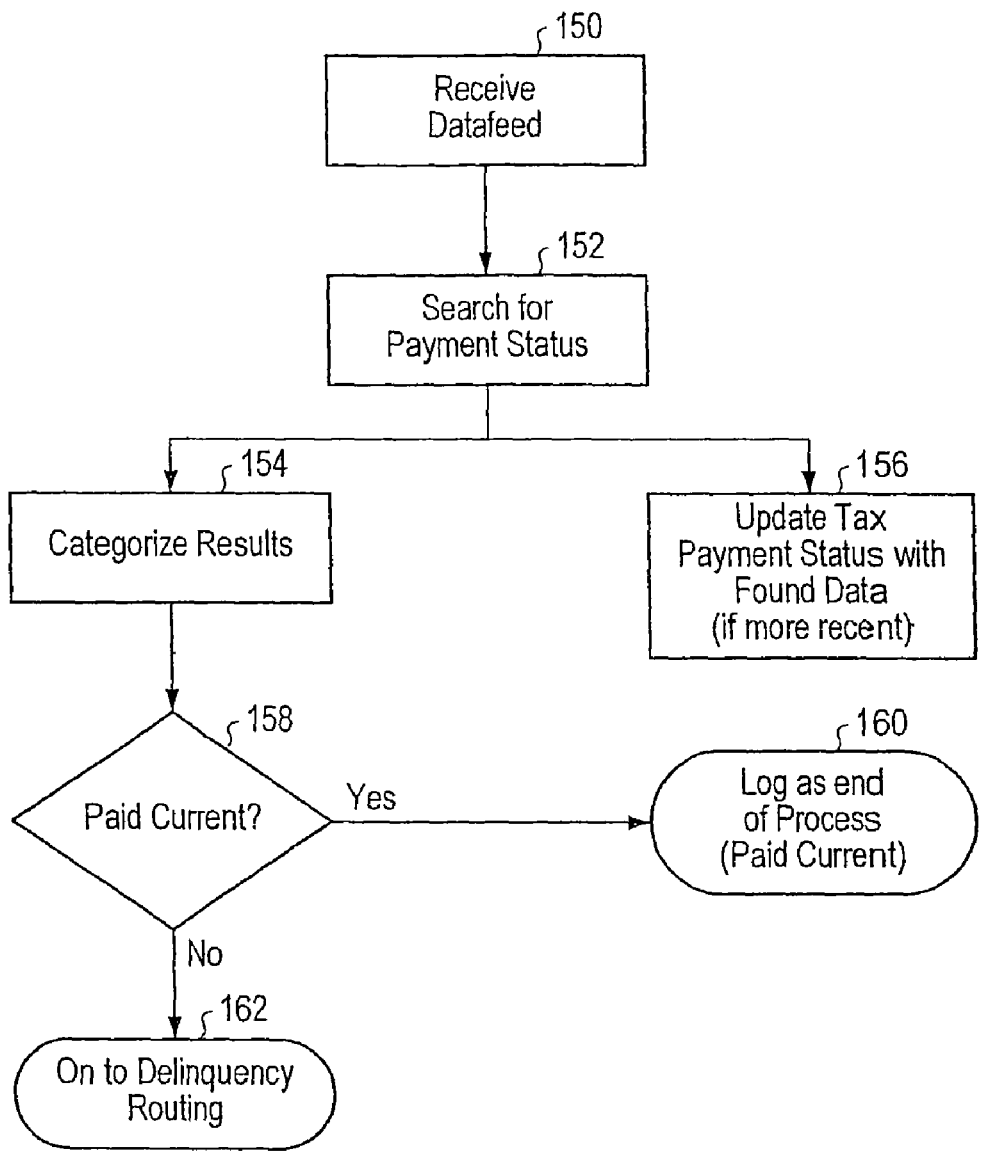
FIG. 3 is a flowchart illustrating searching for tax delinquencies according to one embodiment.

FIG. 3 illustrates searching for tax delinquencies according to one embodiment. In 150, a delinquent tracking system receives a feed including data for loans in a tax service database.

In 152, a search is conducted for payment status and delinquencies associated with the loans. The search may be conducted on data residing in a tax service system (e.g., a tax payment status system) and on data residing in external systems. Multiple systems may be accessed for a given loan or set of loans. For example, if the loans are associated with properties in a particular 20 counties in Texas, the search may include retrieving tax data for each of the 20 counties. A tax identifier such as a tax ID number or property identifying information may be transmitted to the taxing authority system for use in retrieving the appropriate records.

Tax data for performing delinquency searches may be obtained or accessed from various sources in a number of different ways. For example, a service provider may accept file transfers from one or more of the taxing authorities. File transfers may occur at a predetermined frequency for each taxing authority (e.g., annually). In some embodiments, a service provider may subscribe to receive data from one or more taxing authorities. Transfer may be by file transfer, portable media, or another suitable method. In certain embodiments, a tax service system may connect with one or more taxing authority information systems by way of a network, such as a wide area network (WAN). One or more of the taxing authority systems may push tax data to a tax service system on a periodic basis. A tax service system may also "pull" data from taxing authority systems over a network. In certain embodiments, tax data may be transferred over the Internet.

In 154, the results of the search are categorized. Examples of categories include paid, tax sale, delinquent, and unknown. In 156, a tax payment status database is updated with information from the search. Updated information may include information such as delinquencies and paid tax bills. In some embodiments, tax payment system information is updated only after determining that the data from the delinquency search is more recent than that already in the tax payment system.

In 158, each loan is evaluated to determine whether taxes have been paid current. If the taxes have been paid current, then the paid current status is logged in 160. If the taxes have not been paid current, then the process continues with delinquency item routing in 162. One example of delinquency item routing is described herein relative to FIG. 5.

Figure 4:
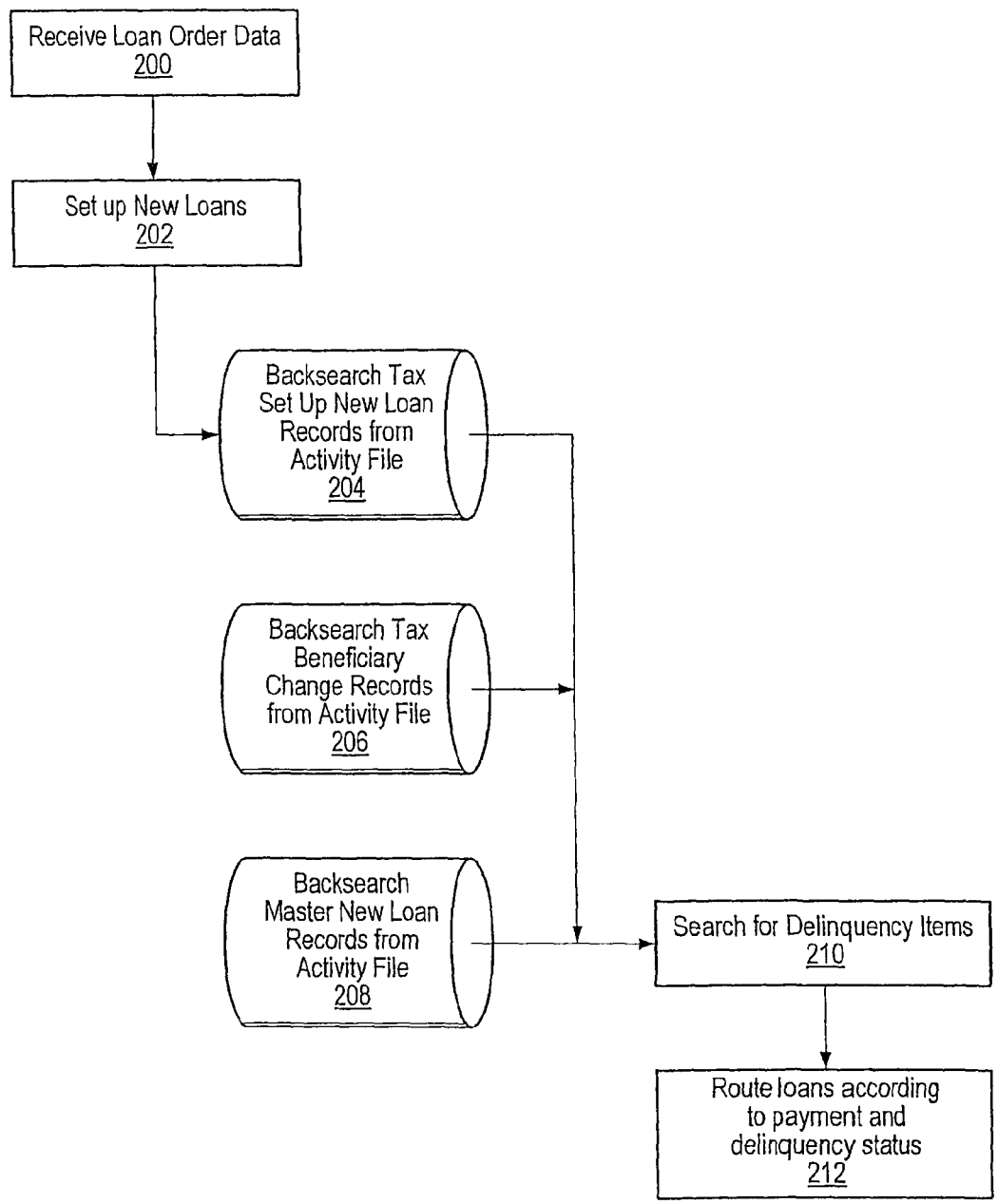
FIG. 4 is a flowchart illustrating a search process for tax delinquencies relating to new loans including backsearching according to one embodiment.

FIG. 4 illustrates an initial delinquency search that includes backsearching of new records according to one embodiment. As used herein, "backsearching" includes searching one or more records that have been previously loaded to a tax service system or loan service system. In some embodiments, backsearching may be 35 limited to records that have been created or modified within a specified interval (e.g., within 3 years prior to the search date). In 200, new loan order data is received into the system. In 202, tax set up records for the new orders are established. In 204, tax setup records for new loans from an activity file are searched for delinquency and tax payment related data for properties associated with the loans. In 206, beneficiary change records from the activity file are searched for delinquency and tax payment related data. A beneficiary change may occur, for example, where a loan previously held by one lender is transferred to another lender. In 208, master records in a tax service database are searched for delinquency and tax payment related data. In 210, the delinquency information compiled in steps 204, 206, and 208 may be processed with data from external sources; such as tax data from taxing authorities. In some embodiments, searches for delinquency items may be as described relative to FIG. 3. In 212, delinquency items are routed for further processing based on the initial payment and delinquency data. In some embodiments, delinquency items on a property are reported to a lender so that-the lender can seek recourse from the party who sold the loan to the lender.

Figure 5:
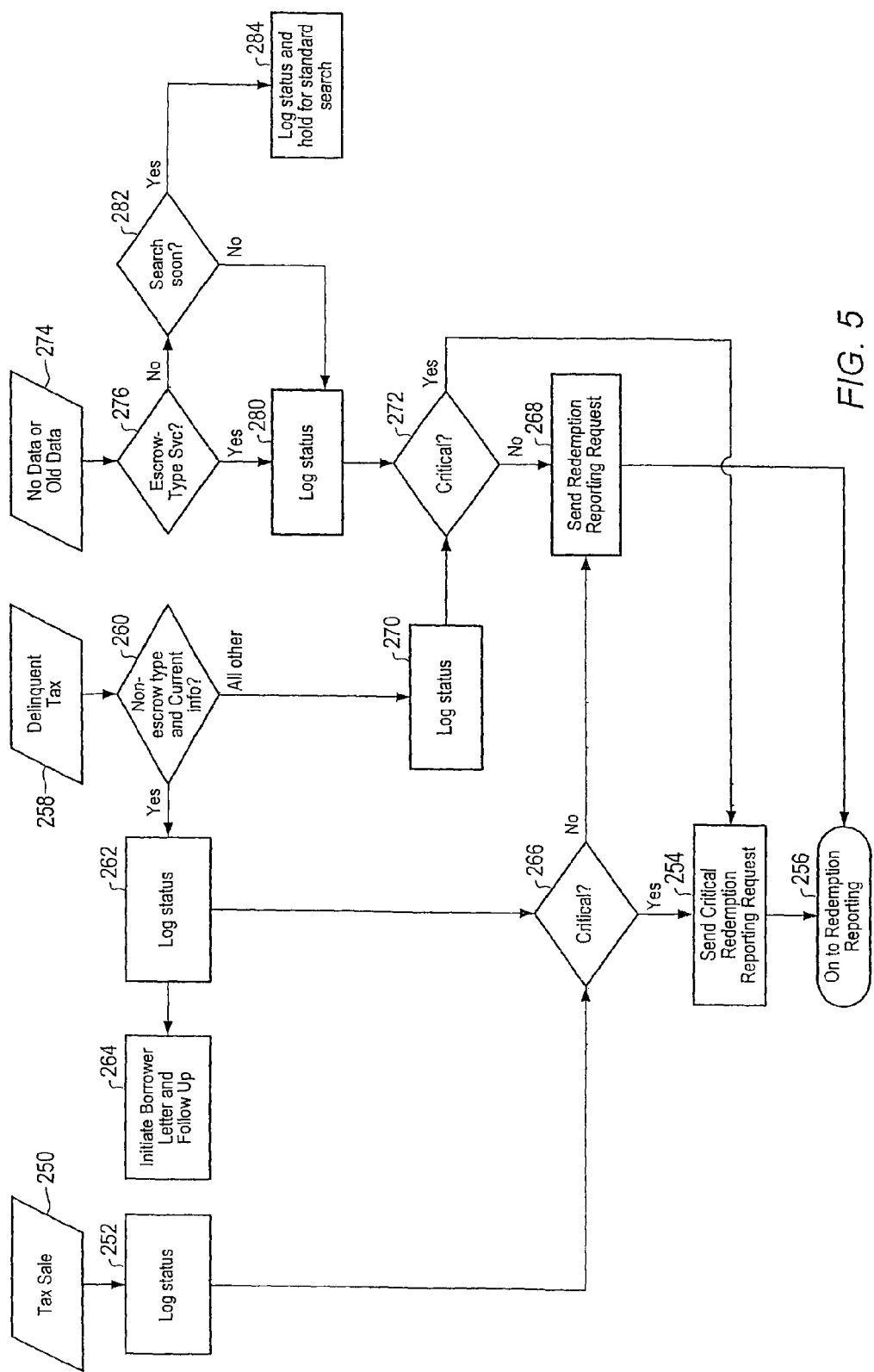
FIG. 5 is a flowchart illustrating routing of delinquency items according to one embodiment.

After tax delinquency items have been identified, business rules may be applied to the delinquency items to determine an appropriate action for the delinquency item. The business rules may be selected to ensure that each delinquency item is routed to mitigate risk of a loss by a lender (e.g., due to a tax sale). FIG. 5 illustrates routing of delinquency items according to one embodiment. Input for the routing process may be received from delinquency searching, such as described above with respect to FIG. 4. In the embodiment shown in FIG. 5, all unresolved delinquencies may eventually be routed for redemption reporting. Delinquency items may be routed and processed based on various criteria. For example, delinquency items may be assessed as "critical" or "non-critical" at certain stages in processing. A designation of "critical" may indicate that action must be taken soon to protect the interests of a lender. Where a delinquency item is determined to have critical status, redemption reporting may be carried out on an expedited basis.

Various criteria may be used to define whether a delinquency item has a critical status. For example, a delinquent tax may be designated as critical if it is more than three years old. The criteria used to define criticality may be customized for different lenders according to the needs and preferences of each lender.

In one embodiment, a delinquent tax is automatically designated as critical if the state or agency of the lien is on a defined list of designated taxing authorities. The taxing authorities on the list may include those states and agencies that are considered relatively high risk from the standpoint of the lender's interest in the property. In some embodiments, the list is customizable for different lenders. For example, Lender A may designate Nebraska, New Jersey, Ohio, Texas, and Washington on a critical state/agency list, while Lender B may designate Massachusetts, Pennsylvania, and Virginia on a critical state/agency list. All delinquencies associated with liens in the states designated by a lender may be treated as critical. In some embodiments, the service provider or a lender may electronically configure a critical state/agency list. In one embodiment, a list made be initially configured or modified over a network. Lenders and service providers may make ongoing, real time changes to the list.

Routing of a delinquency item may vary depending on whether the item is associated with an escrow type loan or a non-escrow type loan. As used herein, an "escrow type loan" means a loan in which a portion of the borrower's payment is put in escrow to pay taxes on the property. As used herein, a "non-escrow type loan" means a loan in which the borrower is responsible for paying taxes on a property directly to the relevant taxing authority. In some embodiments, a delinquency item may be routed according to whether a service provider furnishes escrow services (e.g., tax reporting or tax payment) on a loan secured by a property.

Each category of delinquency item may follow a different path in the process flow. All items may be logged with an appropriate routing code (e.g., paid, delinquent, tax sale, unknown). In some embodiments, routing depends on whether the information for a delinquency item is identified to be current based on predetermined criteria (e.g., less than 90 days old).

Turning to the delinquency item types in FIG. 5, tax sale 250 may be logged in 252. In the embodiment shown in FIG. 5, all tax sales are automatically treated as critical. Thus, in 254, a critical redemption reporting request is made for tax sale 250 after tax sale 250 is logged in. In 256, tax sale 250 is routed to redemption reporting in response to the request.

Delinquent tax 258 is initially routed according to loan type in 260. If the loan associated with a delinquent tax is a non-escrow type loan and current information is available, the delinquent item is logged as with a status of delinquent in 262. In 264, a borrower letter and follow up process is initiated. In 266, the delinquency item is assessed for criticality. In some embodiments, the item may be critical if the delinquent tax eligible for tax sale. If the item is critical, a critical redemption reporting request is made in 254. If the item is not critical, a non-critical redemption reporting request may be made in 268.

Returning to 260, if the item is associated with an escrow-type loan or the information is not current, the delinquent item is logged with an appropriate code in 270. The delinquency item is assessed for criticality in 272. The routing for 272 may be the same as for 266.

In 274, items with no information or out-of-date information are initially routed according to loan type in 276. If the item is associated with an escrow type loan, the item may be logged with an appropriate category in 280. If the item is associated with a non-escrow type loan, the item may be evaluated for whether a standard search will occur soon in 282. If a standard search will occur within a specified time interval (e.g., with 90 days), the item is logged and held for standard search in 284. The item may be subsequently included in a standard, scheduled tax payment status search. If a standard search will not occur within the defined time interval, the item may be logged and sent to Redemption Reporting in 280. In the case that a standard search will not occur with the defined time interval, the item may be assessed for criticality in 272 and processed as previously described.

Figure 6:
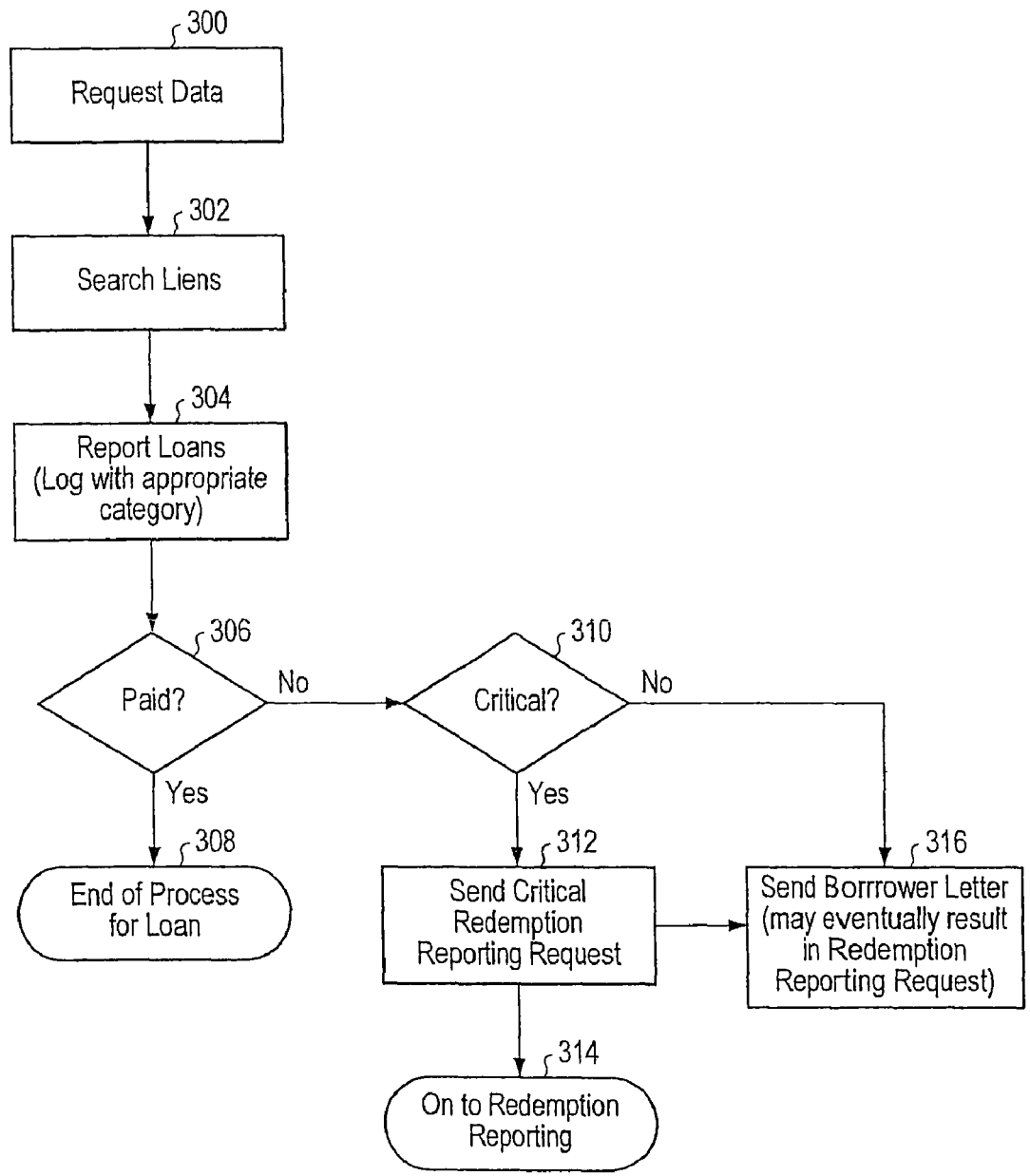
FIG. 6 is a flowchart illustrating standard searching for tax payment status according to one embodiment.

FIG. 6 illustrates a standard search for tax payment status according to one embodiment. Standard searches may occur at prescribed time intervals. Suitable intervals may include monthly, quarterly, or annually. In some embodiments, standard search may be performed at irregular times over the course of a year (e.g., tied 10 to key tax related events). In 300, a request is made for data manually to be used in determining tax payment status. Input data may also be provided automatically via online and batch processing, as well as from delinquency searching and redemption reporting. In 302, liens associated with a defined set of loans are searched for tax payment and delinquency information. In 304, loans are reported and logged with an appropriate category, such as paid, tax sale, or delinquent. In 306, a determination is made whether the required taxes have been paid for each loan. If all required taxes have been paid for a loan, the process is ended for that loan in 308. If all the taxes have not been paid, the delinquency is assessed for criticality in 310. If the status of the delinquency is critical, a critical redemption reporting request is made in 312. If the item is not critical, a borrower notice and follow up process is carried out in 316.

Figure 7:
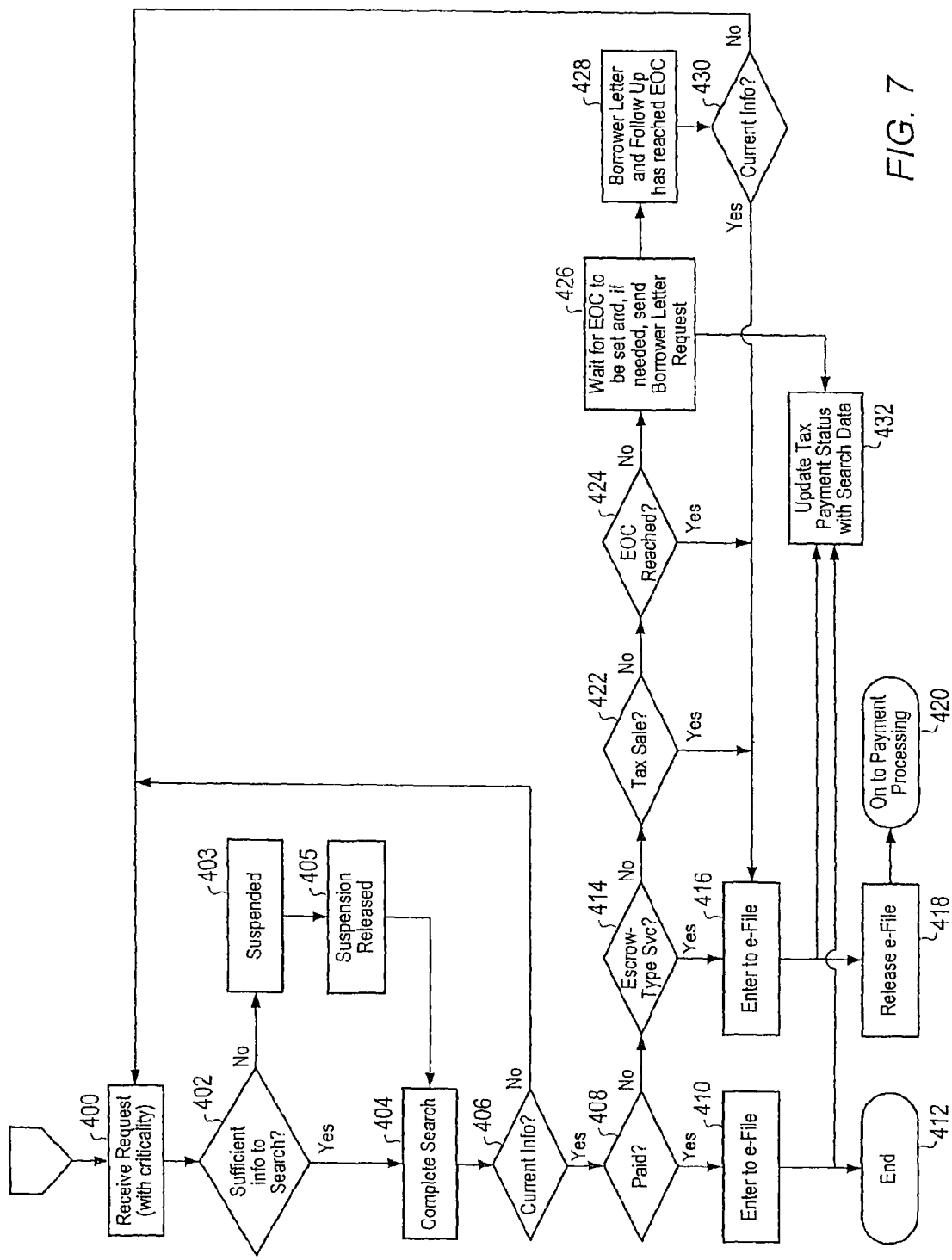
FIG. 7 is a flowchart illustrating redemption reporting according to one embodiment.

FIG. 7 illustrates redemption reporting according to one embodiment. In 400, a request is received to conduct redemption reporting for a delinquency item. The request may include a criticality. The request may be initiated, for example, through one of the processes described with respect to FIGS. 5 and 6.

In 402, an evaluation is conducted on whether the system has sufficient information to perform a 25 redemption search. If there is not sufficient information to perform a search, the request may be suspended in 403. If there is sufficient information to perform a redemption search, the search may be conducted in 404. In cases in which a search has been suspended, the suspension may be released if sufficient data becomes available in 405. Release of a request suspension may occur automatically (e.g., by automatically detecting when the necessary information is accessible) or manually (e.g., by a user override).

In 406, information from the redemption search is evaluated for currency. If the information is current, the delinquency item is evaluated in 408. If the search result indicates that amount of the delinquency has been paid, the end of process is reached in 412. If the search result indicates that amounts owed have not been paid, the type of the loan associated with the delinquency is evaluated in 414. If the loan is an escrow type loan, then an entry is made in an electronic file (e-file) in 416. In 418, the e-file is released. In 420, the e-file is forwarded on to payment processing.

Returning to 414, if the loan is a non-escrow type loan, it is determined sequentially whether the item is a tax sale in 422 or if the end of cycle has been reached in 424. If the item is a tax sale or an end of cycle has been reached, status is set and an entry is made to an electronic file in item 416. If the item is not a tax sale and the end of cycle has not been reached, the process waits for, the end of cycle to be set. If appropriate, a borrower letter and follow up process may be initiated. In 428, the end-of-cycle is reached in the borrower notice and a follow up process. The information may be checked for currency in 430. If the information is current, status is set and an entry is made in an electronic file in 416. In each case, tax payment status may be updated in 432.

Figure 8:
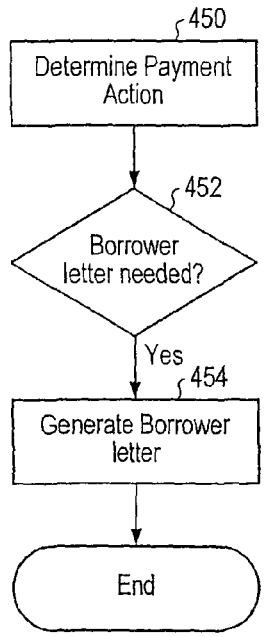
FIG. 8 is a flowchart illustrating payment determination and processing of a redemption amount on a property according to one embodiment.

FIG. 8 illustrates payment processing of a reported redemption amount associated with a tax lien according to one embodiment. In 450, a determination is made on what action should be made on the property associated with the lien. Actions may include, but are not limited to, making payment, holding payment, or denying payment. In addition, a decision may be made whether a produce a borrower letter relating to the payment in 452. If so, a letter is generated in 454.

In some embodiments, redemption search and reporting is automatically performed following identification of delinquency items. Processing may be ordered one delinquency at a time in response to a user query. Preferably, however, processing of delinquency items is carried out through a batch process. Redemption searching and reporting may be performed selectively on only those delinquency items meeting predetermined criteria. The criteria maybe selected to ensure that redemption reporting is accomplished in a timely manner on delinquencies for which the risk of loss to a lender is high. Automatically performing redemption search may reduce costs associated with manual review of delinquencies. At the same time, selectively performing redemption searches on delinquency items may eliminate unnecessary processing. For example, for some delinquency items, such as those that have only recently become delinquent, the risk of loss may be negligible or low. Eliminating redemption reporting for low risk items may reduce processing requirements for a system, since redemption processing can be performed on a smaller number of records. Advantages of reduced redemption searching and reporting may include lower central processor demands, lower bandwidth requirements, lower hardware costs, and reduced search transaction fees.

In some embodiments, a determination on whether payment a payment should be made on a delinquency may be made automatically. The payment determination may follow redemption reporting on a delinquency item. As with redemption searching and reporting, payment processing may be performed selectively on only those delinquency items meeting predetermined criteria. Criteria may be selected to ensure that action is taken (e.g., payment made to remedy a tax delinquency) in a timely manner on delinquencies for which the risk of loss to a lender is high. Conversely, no action may be taken on delinquencies for which the risk of loss is low or negligible.

Predetermined criteria for processing a delinquency item (e.g., capturing a redemption amount or initiating tax payment) may be embodied in a set of business rules. In some embodiments, the business rules produce a different result depending on the state in which the lien exists. In one embodiment, each delinquent item is assessed against a "state matrix" in which a threshold date is defined for each state or agency. The threshold time to act may be shorter for states that act more aggressively on delinquent taxes, and longer for states that act less aggressively on delinquent taxes. In some embodiments, the threshold time is a particular calendar year.

In some embodiments, the predetermined criteria for processing a delinquency item may include business rules for an equity analysis. The equity analysis may provide guidance on whether action is required for a particular loan. For example, if, at a given time, the estimated equity of a borrower in a property is large compared to a loan balance or the amount of delinquent tax, payment to cure the delinquency may not be necessary to adequately protect the interest of the lender.

In an embodiment, a system may allow lenders to customize automatic processing for loans processed for that lender. For example, one lender may specify the use of a broker price method for performing an equity analysis, while another lender may specify the use of an automated value model. In some embodiments, lenders may opt in or opt out of particular processing actions. For example, while one lender may choose to perform an equity analysis if a state criticality test is met, another lender may choose to forego equity analysis and go immediately to a redemption search if a state criticality test is met. In some embodiments, lender preferences are submitted in writing or electronically to a service provider and the service provider enters the preferences into a tax service system. In other embodiments, a lender may specify preferences over a network.

Figure 9:
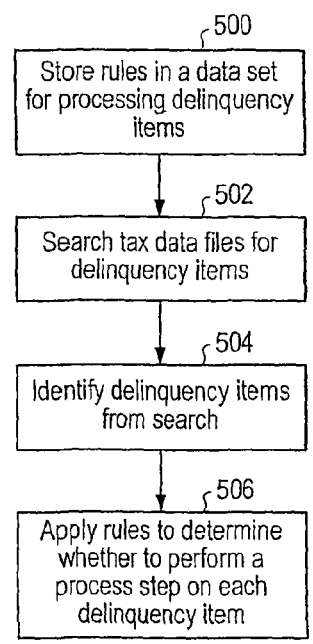
FIG. 9 is a flowchart illustrating delinquency item processing based on rules according to one embodiment.

FIG. 9 illustrates processing tax delinquency items according to rules. In 500, rules for processing delinquency items are stored in a data set. In 502, tax data files are searched for delinquency items. In one embodiment, the tax data files are received or accessed from a multitude of taxing authorities. In 504, delinquency items are identified from the search. In certain embodiments, a backsearch of records in one or more tax service databases and/or loan databases may be performed to identify past due tax payments and other delinquency items. In 506, rules are applied to determine whether to perform one or more processes with respect to each delinquency item. For example, the stored rules may be applied to determine whether a payment should be made by a lender to redeem a property to protect the lender's interest in a property.

Figure 10:
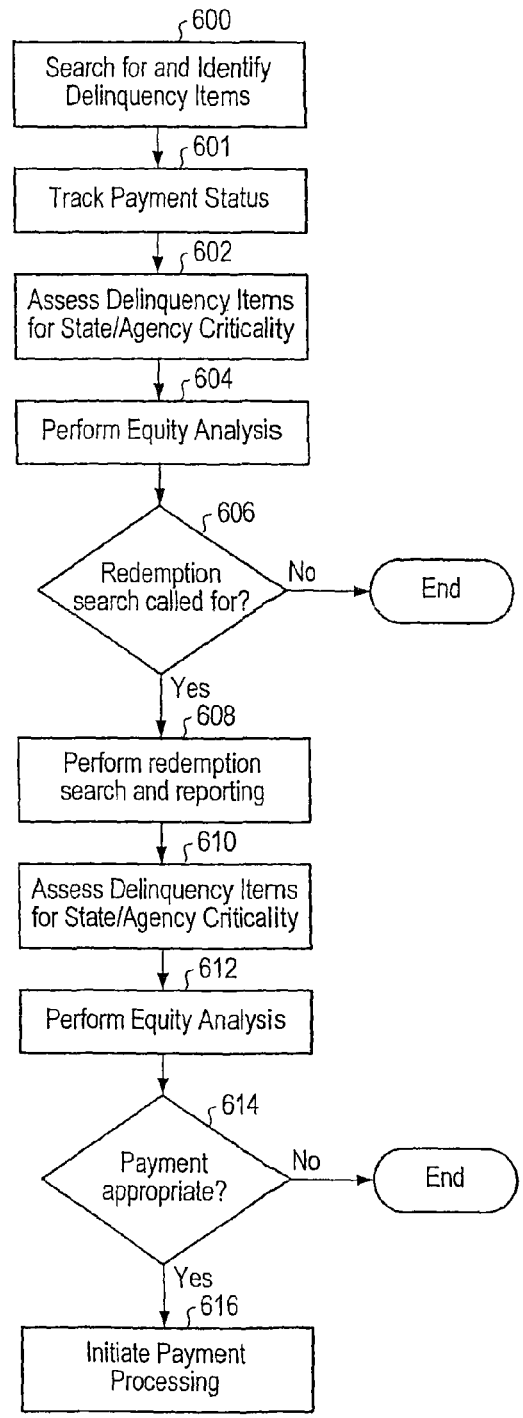
FIG. 10 is a flowchart illustrating automatic redemption searching and payment determination according to one embodiment.

FIG. 10 illustrates a selective redemption searching and payment determination processing according to one embodiment. In 600, delinquency items are searched and identified. Search and identification may be accomplished, for example, using the process described in FIG. 4. In 601, tax payment status may be checked based on data available in a tax service system database. In 602, delinquency items (e.g., tax liens) associated with the delinquent items are assessed for criticality based on the state or agency. In 604, an equity analysis is performed for the delinquency items. Based on the results of steps 602 and 604, a determination of whether to proceed with redemption searching is made in 606. If redemption searching is called for, redemption searching and reporting is conducted in 608.

After redemption searching and reporting, delinquency items for which redemption amounts have been captured may be assessed to determine whether payment on the delinquency is appropriate. In 610, liens associated with the delinquency items are re-assessed for criticality based on the state or agency. The criteria for 610 may be the same or different as that applied in 602. In 612, an equity analysis is re-performed for the delinquency items. The criteria for 612 may be the same or different as that applied in 604. Based on the results of steps 610 and 612, a determination of whether to initiate payment is made in 614. If payment is appropriate, processing to initiate payment to occur may be accomplished in 616.

In the embodiment shown in FIG. 10, the determinations for both redemption search and payment rely on state/agency criticality and equity analysis. Various other combinations of criteria may be used, however. For example, state criticality or equity analysis may be omitted for one or both of the determinations. In addition, various other criteria may be applied in addition to or instead of state criticality analysis and equity analysis. Examples of such other criteria may include a service type (e.g., escrow service or non-escrow service), a loan amount, and the absolute age of delinquency.

Figure 11:
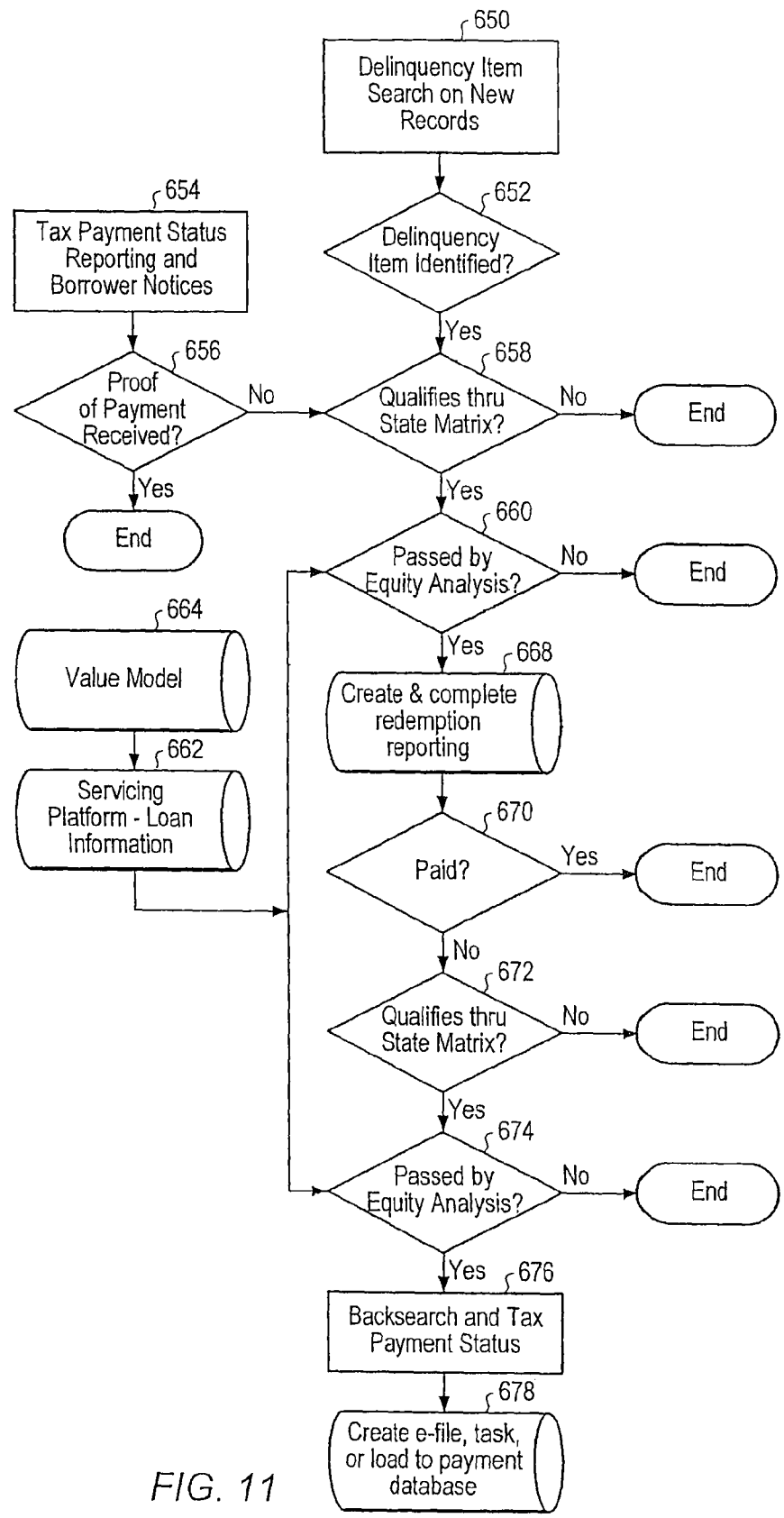
FIG. 11 is a flowchart illustrating redemption searching and payment determination using state matrix selection according to one embodiment.

FIG. 11 illustrates a redemption searching and tax payment determination process including a state matrix selection according to one embodiment. In the embodiment shown in FIG. 11, identification of delinquency items is fed by two sources: backsearch and delinquency searching on new loan records system in 650, and data from a tax payment reporting and borrower notice system in 654. In one embodiment, the sources are determined as described relative to the embodiments shown in FIGS. 4 and 6. In 652, delinquency items are submitted to the state matrix selection. As used herein, a "state matrix" includes a data set that includes values on a state-by-state or agency-by-agency basis. As used herein, "state matrix selection" includes any process of selecting records for processing based on state-by-state or agency-by-agency criteria. Examples of data sets include a data table, data record, a data group, a random table, and a row from a table.

In 656, if proof of payment received is not established in the tax payment status reporting and borrower notice process, the item is submitted to the state matrix selection.

In 658, a state matrix selection is performed on the item. In state matrix selection, business rules may be applied to determine whether further processing of an item is appropriate. In one embodiment, the state matrix is a data table that includes a threshold date (e.g., a threshold year) for each state or other agency in which liens may exist. For example, the matrix may include, for each of the 50 states, the delinquent tax year in which the lender is likely to lose the lender's collateral (i.e., the property used to secure the loan). A delinquency date (e.g., the year the delinquent item was due) may be compared to the threshold year. If the year of the delinquency item is the same as or earlier than the threshold year, further processing of the item is appropriate.

In 660, an equity analysis selection is carried out on the item. In one embodiment of an equity analysis, a value model is used to determine an estimated value of the property associated with the delinquency item. The value model, as well as information related to the loan, may be provided from databases 662 and 664. Suitable value models may include broker price option (BPO) method, a property appraisal, or an automated value model (AVM). Business rules may be applied to the equity analysis to determine whether further processing of the delinquency item is appropriate.

In 668, redemption reporting may be performed for the delinquency item. Redemption reporting may include searching data received from or accessed in one or more external databases. Such external databases may include databases maintained or controlled by a taxing authority for the property associated with the delinquency item. Based on the information retrieved in the search, a redemption amount is captured and/or calculated.

In 670, payment status of the delinquency item is rechecked. If the item is not paid, state matrix selection is performed to determine whether payment maybe appropriate for the item in 672. If the state matrix criteria are met, an equity analysis is performed on the item in 674. The equity analysis may indicate that payment should be initiated for the item.

If the equity analysis is passed, backsearch and/or tax payment status check may be performed as a final check on whether payment is appropriate to address a delinquency item on a property in 676. An example of process following post-redemption is given relative to FIG. 12. In 678, following the post-redemption report checking, an e-file or task may be created for the delinquency item. If the determination is that payment is warranted, payment may be initiated after authorization from the lender, or as determined from the lender's business rules.

Figures 12, 13:
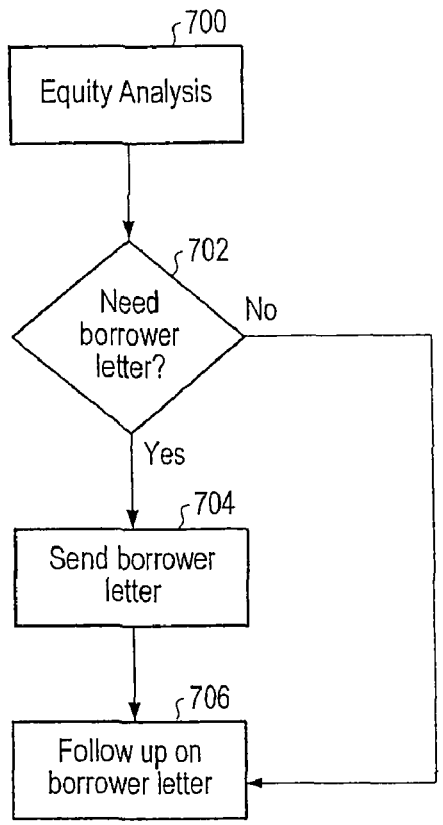
FIG. 12 is a flowchart illustrating searching for delinquency and tax payment status after redemption reporting according to one embodiment.
FIG. 13 is a state matrix table according to one embodiment.

FIG. 12 illustrates one embodiment of update processing after redemption reporting according to one embodiment. In 700, an equity analysis indicates that payment to taxing authority may be appropriate for a delinquency item. In 702, a determination is made whether to send a borrower letter. In 704, a borrower notice and follow up process is carried out for the item. In 706, a follow up procedure is accomplished for the borrower letter.

FIG. 13 illustrates an example of entries in a state matrix table according to one embodiment. While only three states are shown as examples, in FIG. 13, it will be understood that a state matrix table may include entries for all 50 states. In this example, each state has a qualifying delinquent year 722, which may vary from state to state. For some states, for example, it may be desirable to act immediately on any delinquencies. For such states, the qualifying delinquent year is the same as the current year 724. In other states, a property may have delinquent taxes for several years before action is needed to protect lender's interest. For such states, the qualifying delinquent year is an earlier year than current year 724.

Figures 14, 15:
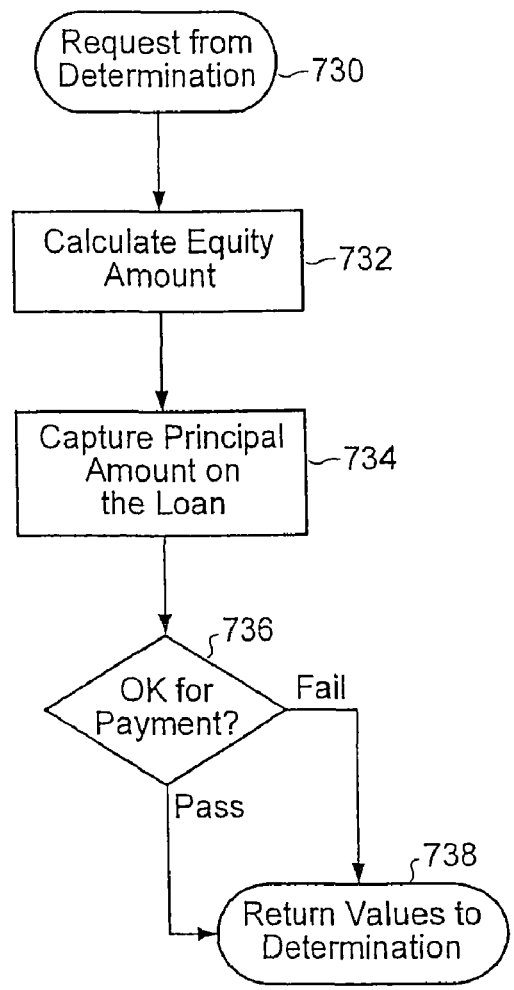
FIG. 14 is a flowchart illustrating an equity analysis according to one embodiment.
FIG. 15 is a foreclosure cost table according to one embodiment.

FIG. 14 illustrates an equity analysis according to one embodiment. In 730, a request for an equity analysis is received from a redemption search determination process or pay determination process. In 732, an equity amount (e.g., net at sale value) is calculated.

In 734, a principal loan amount is captured for the loan. In some embodiment, the principal loan amount is retrieved from a lender's loan database. In other embodiments, the principal loan amount is captured from a service provider's loan database. In 736, an assessment is made on whether it is acceptable to pay the redemption amount based a set of rules. Whether the equity analysis results in a pass or a fail, the values are returned to the determination process in 738.

In one embodiment, the equity analysis is based on the following net at sale formula and rules:

| Net at Sale | |
|---|---|
| Current Appraisal Amount (x) = Carrying Cost | $100,000 × .05 = ($5,000) |
| Estimated Value (.06) = Real Estate Commission | $80,000 × .06 = ($4,800) |
| Foreclosure Cost + Eviction Cost Redemption Amounts | $2,000 + $400 = ($2,400) ($1,000) Net at Sale $66,800 |

Tax Payment Rules:
If net of sales is equal to or greater that the principal balance then pay the taxes
If net of sales is less that the principal balance then do not pay the taxes FIG. 15 illustrates a foreclosure table according one embodiment. The foreclosure cost table may provide cost allowance 740 on a state-by-state basis. For example, in one embodiment, X=$2,000, Y=$1,000, and Z=$1,200.

Figure 16:
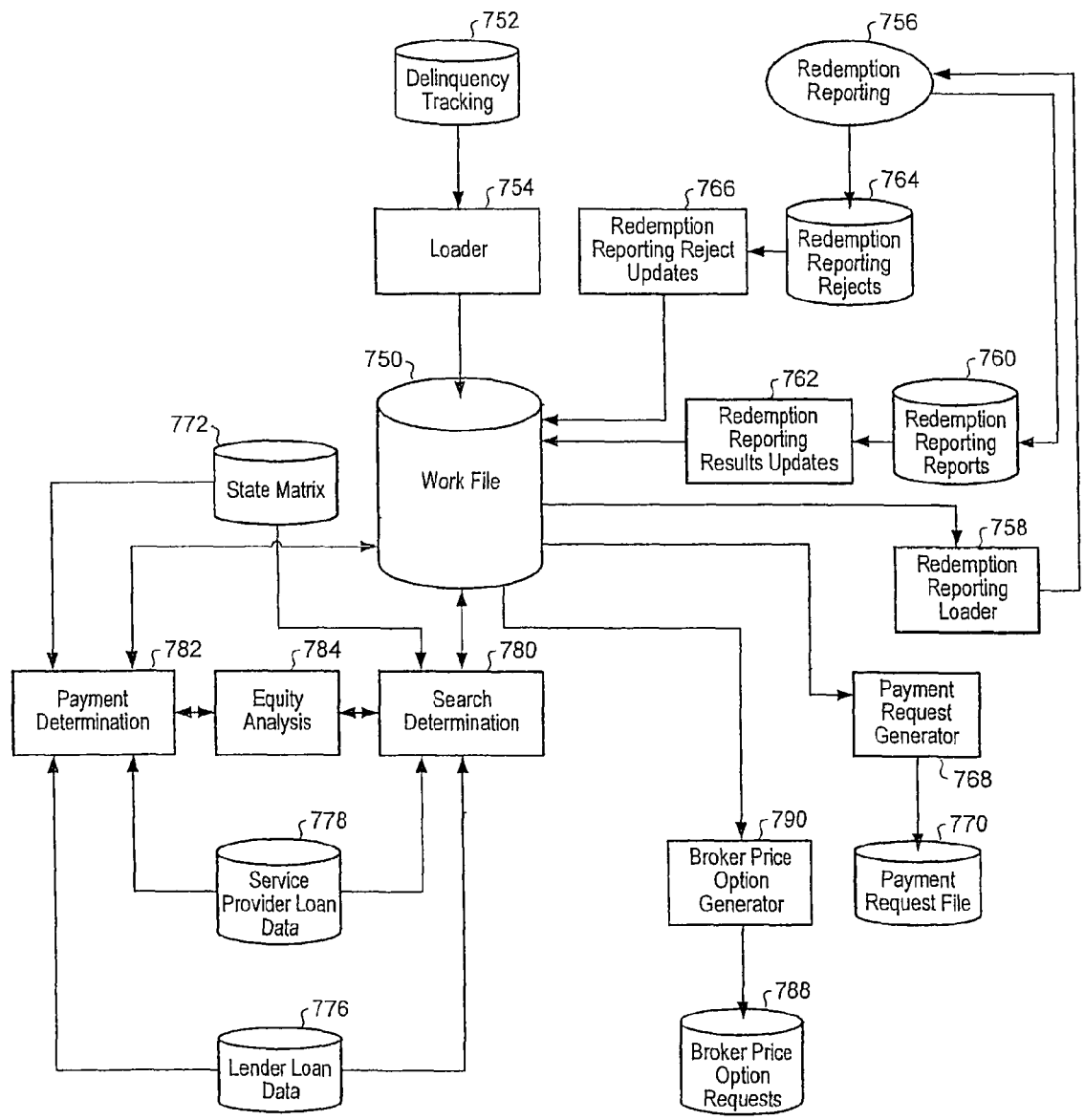
FIG. 16 is a block diagram illustrating a system for redemption reporting and payment according to one embodiment.

FIG. 16 is a block diagram of a system for search redemption reporting and payment according to one embodiment. A work file 750 may be stored and updated in a database coupled to a tax service system. Loader 754 may load data from delinquency tracking files 752 into work file 750. Delinquency tracking data may be used by the system for various decision-making and monitoring tasks.

Redemption reporting loader 758 loads data from the work file 750 to redemption reporting process 756. Redemption reporting process 756 may produce redemption report data and store the redemption report data in results file 760 and rejects file 764, as appropriate. Work file 750 may be updated in processes 762 and 766 using data from results file 760 and rejects file 764, respectively. Payment request generator 768 may generate payment requests from work file 750. Payment requests may be stored in payment request file 770.

Search determination process 780 and payment determination process 782 may use data from state matrix file 772, lender loan data file 776, and service provider loan data file 778. Equity analysis process 784 may support search determination process 780 and payment determination process 782. Broker price option (BPO) generator 790 may generate requests for broker price option (BPO) values. The requests may be stored in BPO request file 788.

Figure 17:
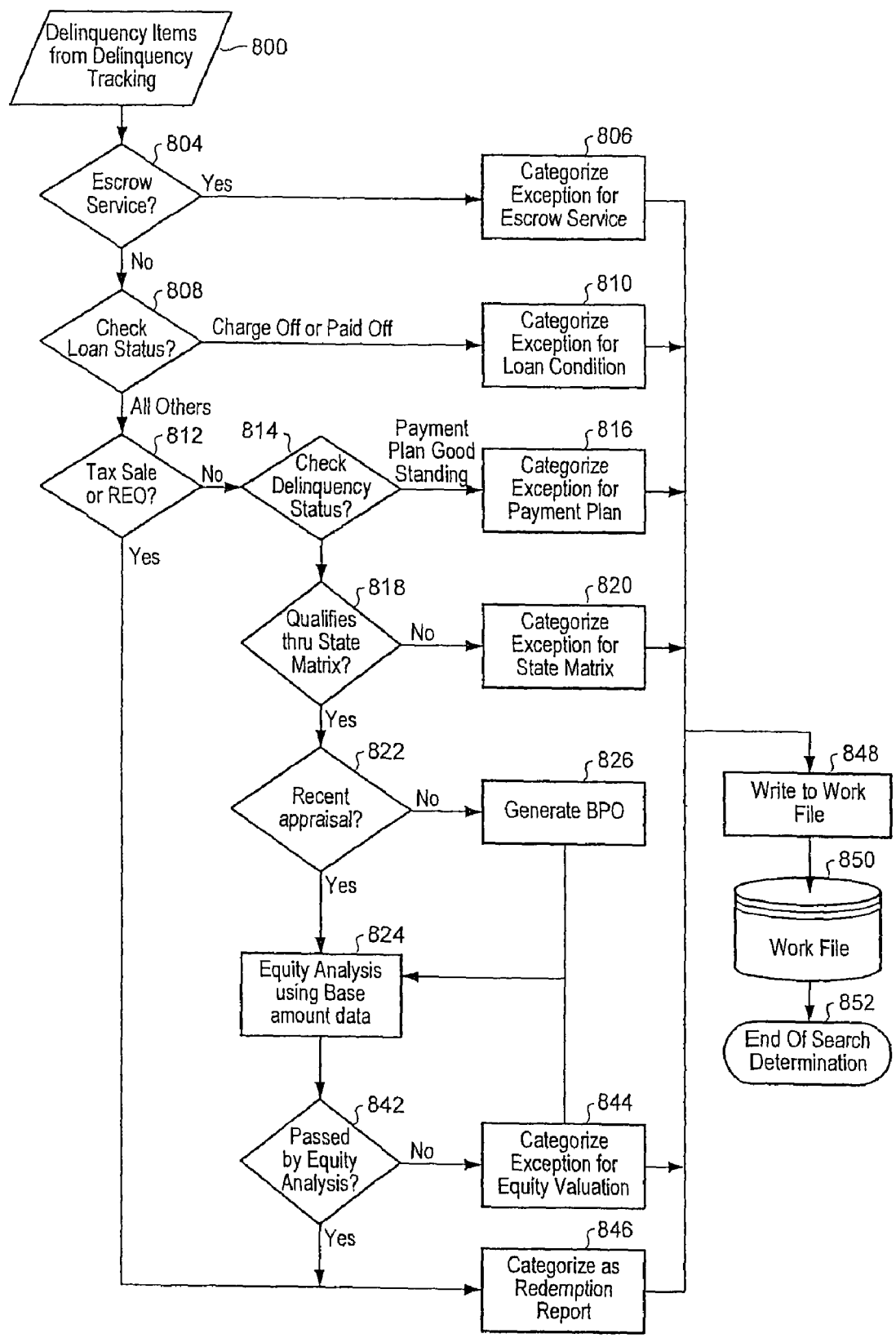
FIG. 17 is a flowchart illustrating a redemption search determination according to one embodiment.

FIG. 17 illustrates a redemption search determination according to one embodiment. In 800, current delinquent data is loaded from a database. As used herein, a "delinquency tracking system" or "delinquency locator" includes a service or system that acquires data on delinquency items. A delinquent locator may be provided through one or more computer programs running on a tax service system or by a stand-alone system.

Duplicate lien checks may be made prior to loading.

Continuing the process in steps 804-818, a series of checks are made to determine whether to continue payment processing or to create an exception for the lien from the process. For each check, if the lien is categorized as an exception, processing of the lien ends. If the lien is not categorized as an exception, processing continues.

In 804, the service type of the loan is checked. If the loan is an escrow service type lien, the lien is categorized as an exception in 806. In 808, the status of the loan associated with the lien is checked. If the loan has been charged off or paid off, the lien is categorized as an exception in 810.

In 812, two additional conditions are checked for: a tax sale indicator and Real Estate Owned (REO) condition (e.g., the property is "real estate owned" by a financial institution). The tax sale indicator may come 10 from a delinquency locator service. The REO condition may come from an REO code in loan data from a lender or service provider. If either a tax sale indicator or REO condition is found, the lien is immediately loaded to Redemption Reporting in 846.

In 814, if a payment plan is in effect for all liens associated with the associated loan, the lien is categorized as an exception in 816. Based on the flow in FIG. 16, if a loan has been charged off, the lien will go into the exception queue even if an REO code exists for this loan. On the other hand, if the condition exists where both a tax sale indicator and a payment plan indicator are on the same loan, the tax sale indicator takes precedence and the loan is sent to redemption reporting.

In 818, the lien is run through the state matrix where the year of the delinquency will determine whether to continue processing. The values in the state matrix for each state may be based on the delinquent tax year in which the loss of collateral (the property used to secure the mortgage) in that state is imminent or the risk of loss is unacceptably large.

In 822, those liens meeting the state matrix requirement are checked for current appraisal date (e.g., an appraisal within a specified number of days of the current date) and an appraisal amount greater than zero. Those with current appraisal dates and positive appraisal amounts continue to an equity analysis in 824. For those liens that do not have current dates and a positive appraisal amount, a BPO generator 828 will generate BPO request and return the BPO for use in the equity analysis. In certain embodiments, requests for which no BPO has been returned after a predetermined number of days are forced directly to redemption reporting.

In 842, an equity analysis is performed for the lien. The equity analysis may be a calculation using the current BPO less certain discounts/costs compared to the remaining principal amount on the loan. Base tax amounts (i.e., tax amounts not including interest, costs etc. required for redemption) are used in the equity analysis. If the lien meets the rules for payment in the equity analysis program, a redemption search/reporting is undertaken in 846 to capture and/or compute redemption dollar amounts for the lien. In each case, updates are made to work file 850 in 848. The exception category, if any, and status of each lien is included in the update.

Figure 18:
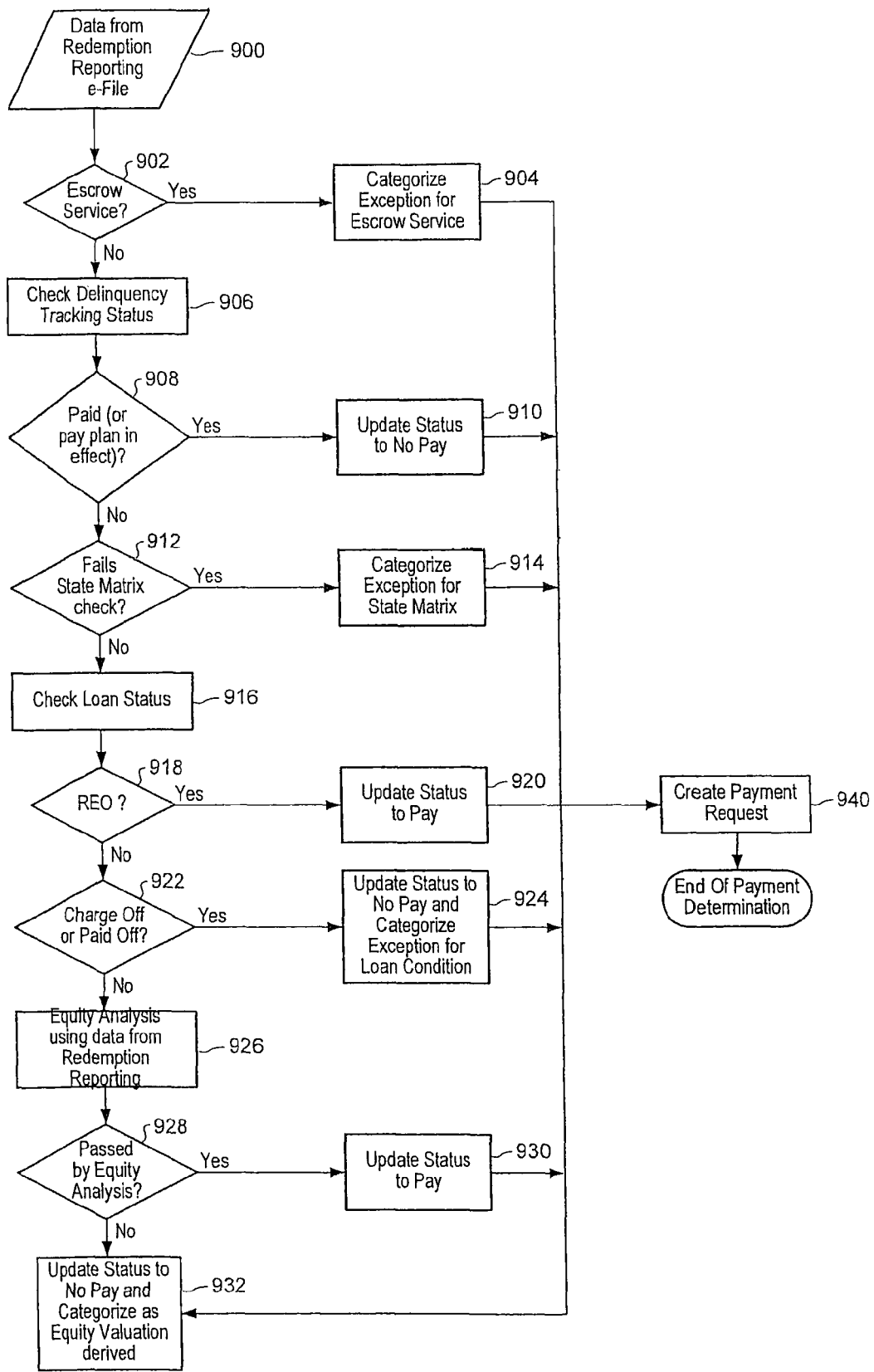
FIG. 18 is a flowchart illustrating a payment determination according to one embodiment.

FIG. 18 illustrates a tax payment determination according to one embodiment. Once work in the redemption reporting process is completed, updates to the work file are made. Redemption dollar amounts may be received via electronic file to the pay determination process shown in FIG. 18. In some embodiments, liens that meet certain criteria may bypass the payment determination process and go directly to the creation of a payment request for payment of the taxes. For example, liens associated with an REO property may bypass the pay determination process and directly result in a payment request.

In steps 902-910 and 916-924, the lien is run through exception checks similar to the checks run during the redemption search determination described in FIG. 17. In 912, the lien is again testing against the state matrix. In 926, an equity analysis is run for those passing all checks and meeting the state matrix criteria. For the equity analysis in 926, the analysis is refined to use the redemption amounts from redemption reporting 846 (as opposed to the base amounts used in the earlier equity analysis for the redemption search determination described with respect to FIG. 17). In 940, a payment request is generated to notify the lender that a payment may be needed or to make the payment according to the lender's business rules.

Figure 19:
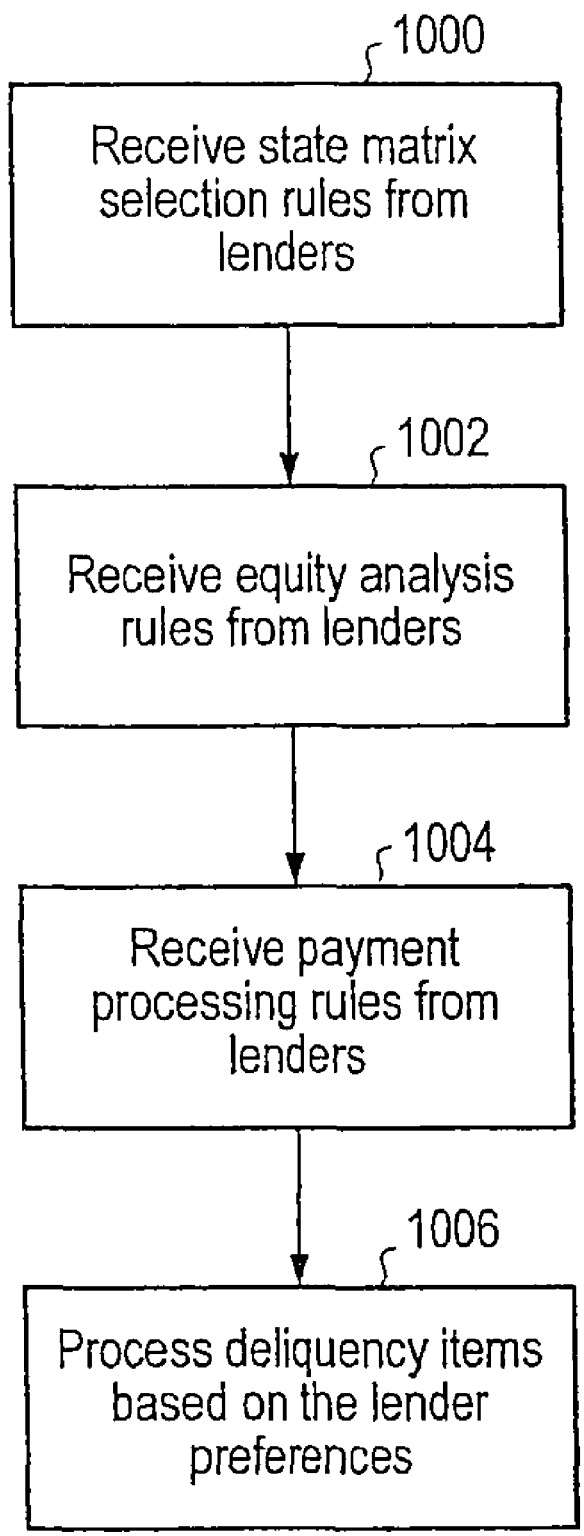
FIG. 19 is a flowchart illustrating custom processing of delinquency items based on lender-specified rules according to one embodiment.

FIG. 19 illustrates custom processing of delinquency items according to lender preferences according to one embodiment. Preferences may be in the form of rules to be applied for all delinquency items associated with loans by the lender. In 1000, rules are received from lenders for state matrix selection. Each lender's rules may establish different criteria for each state on whether to perform a process. In 1002, rules are received for performing equity analysis. In 1004, rules are received from lenders for processing payments on delinquency 25 items. In one embodiment, a lender's rules for processing payments may be applied automatically in a tax service system for those delinquency items where a payment determination indicates that a payment is warranted (e.g., as determined from the process described relative to FIG. 18). In 1006, delinquency items are processed based on lender preferences.

In some embodiments, a lender's rules may effected by a lender opting in or out of a standard process. For example, a tax service system may perform an equity analysis prior to performing a redemption search on delinquency items unless the lender customer associated with the delinquency item opts out.

Embodiments of subset or all (and portions or all) of the above may be implemented by program instructions stored in a memory medium or carrier medium and executed by a processor. A memory medium may include any of various types of memory devices or storage devices. The term "memory medium" is intended to include an installation medium, e.g., a Compact Disc Read Only Memory (CDROM), floppy disks, or tape device; a computer system memory or random access memory such as Dynamic Random Access Memory (DRAM), Double Data Rate Random Access Memory (DDR RAM), 5 Static Random Access Memory (SRAM), Extended Data Out Random Access Memory (EDO RAM), Rambus Random Access Memory (RAM), etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer that connects to the first computer over a network, such as the Internet. In the latter instance, the second computer may provide program instructions to the first computer for execution. The term "memory medium" may include two or more memory mediums that may reside in different locations, e.g., in different computers that are connected over a network.

In some embodiments, a computer system at a respective participant location may include a memory medium(s) on which one or more computer programs or software components according to one embodiment of the present invention may be stored. For example, the memory medium may store one or more programs that are executable to perform the methods described herein. The memory medium may also store operating system software, as well as other software for operation of the computer system.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts, processes, and steps may be reversed or reordered, and certain features of the invention may be utilized independently, all as would be apparent to one skilled in the art after having the benefit of this description of the invention. Changes may be made in the elements described herein without departing from the spirit and scope of the invention as described in the following claims. Headings used this detailed description are for the convenience of the reader, and are not intended to the limit the scope of the invention. As used herein, "includes" or "including" means "including, but not limited to".

What is claimed is:

1. A computer-implemented method of processing tax delinquency status on a property throughout a term of a loan, comprising:
   receiving a property identification information relating to the property;
   monitoring with a processor at least one tax database throughout the term of the loan for any change in the tax delinquency status related to the property, said monitoring including performing a state matrix selection that determines whether further processing is needed to resolve a tax related item identified for said property, and applying state-specific or agency-specific business rules to said tax related item to resolve said tax related item; and
   notifying a lender of any change in the tax delinquency status related to the property during the term of the loan.

2. A computer-implemented method of processing tax delinquency items associated with taxes on a property throughout a term of a loan comprising:
   receiving a property identification information relating to the property;
   monitoring with a processor at least one tax database throughout the term of the loan for any tax delinquency items related to the property;
   locating any tax delinquency items associated with the property; and
   extinguishing any tax delinquency items during the term of the loan based on an equity analysis and a state matrix selection process, said monitoring including performing a state matrix selection that determines whether further processing is needed to resolve a tax related item identified for said property, and applying state-specific or agency-specific business rules to said tax related item to resolve said tax related item.

3. The method of claim 2, wherein the equity analysis extinguishes the tax delinquency if the estimated equity of a borrower in the property is small compared to the loan balance or the amount of delinquent tax, payment to cure the delinquency is necessary to adequately protect the interest of a lender.

4. The method of claim 2, wherein the state matrix a threshold date is defined for each state or agency, and the threshold time for each state in determining whether to extinguish the tax delinquency item(s).

5. The method of claim 2, wherein the equity analysis comprises extinguishing the tax delinquency item(s) if the net of sales is equal to or greater than the principal balance.

6. A computer-implemented system for processing tax delinquency status on a property throughout a term of a loan, comprising:
   an interface;
   a CPU; and
   a memory coupled to the CPU, wherein the memory comprises program instructions that when executed by the CPU causes the CPU to:
   receive a property identification information relating to the property through the interface;
   monitor with the CPU at least one tax database throughout the term of the loan for any change in the tax delinquency status related to the property; and
   notify via said interface a lender of any change in the tax delinquency status related to the property during the term of the loan, said monitor with the CPU including performing a state matrix selection that determines whether further processing is needed to resolve a tax related item identified for said property, and applying state-specific or agency-specific business rules to said tax related item to resolve said tax related item.

7. A computer-implemented system of processing tax delinquency items associated with taxes on a property throughout a term of a loan comprising:
   an interface;
   a CPU; and
   a memory coupled to the CPU, wherein the memory comprises program instructions that when executed by the CPU causes the CPU to:
   receive a property identification information relating to the property through the interface;
   monitor with the CPU at least one tax database throughout the term of the loan for any tax delinquency items related to the property;
   locate any tax delinquency items associated with the property; and extinguish any tax delinquency items during the term of the loan based on an equity analysis and a state matrix selection process, said monitor with the CPU including performing a state matrix selection that determines whether further processing is needed to resolve a tax related item identified for said property, and applying state-specific or agency-specific business rules to said tax related item to resolve said tax related item.

* * * * *